US007249320B2

(12) United States Patent  
Simmons et al.

(10) Patent No.: US 7,249,320 B2  
(45) Date of Patent: Jul. 24, 2007

(54) METHOD AND SYSTEM FOR DISPLAYING A TITLE AREA FOR A PAGE SERIES

(75) Inventors: Alex Simmons, Seattle, WA (US); Stuart Stuple, Carnation, WA (US); Christopher Pratley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 392 days.

(21) Appl. No.: 10/379,473

(22) Filed: Mar. 4, 2003

(65) Prior Publication Data

US 2004/0177324 A1 Sep. 9, 2004

(51) Int. Cl.  
*G06F 3/00* (2006.01)

(52) U.S. Cl. ...................... 715/530; 715/525

(58) Field of Classification Search ............. 715/530, 715/525  
See application file for complete search history.

(56) References Cited

U.S. PATENT DOCUMENTS

| | | | | | |
|---|---|---|---|---|---|
| 5,321,831 | A | * | 6/1994 | Hirose ......................... 707/10 |
| 5,421,015 | A | * | 5/1995 | Khoyi et al. ................. 718/107 |
| 5,524,201 | A | * | 6/1996 | Shwarts et al. .............. 715/763 |
| 5,581,752 | A | * | 12/1996 | Inoue et al. .................. 715/526 |
| 5,634,064 | A | * | 5/1997 | Warnock et al. ............. 715/513 |
| 5,634,124 | A | * | 5/1997 | Khoyi et al. .............. 707/103 R |
| 5,943,679 | A | * | 8/1999 | Niles et al. .................. 715/526 |
| 6,026,416 | A | * | 2/2000 | Kanerva et al. .............. 715/515 |
| 6,046,743 | A | * | 4/2000 | Stenton ........................ 715/776 |
| 6,081,817 | A | * | 6/2000 | Taguchi ........................ 715/526 |
| 6,105,044 | A | * | 8/2000 | DeRose et al. ............... 715/514 |
| 6,199,080 | B1 | * | 3/2001 | Nielsen ......................... 715/513 |
| 6,342,901 | B1 | * | 1/2002 | Adler et al. .................. 715/700 |
| 6,393,469 | B1 | * | 5/2002 | Dozier et al. ................ 709/219 |
| 2002/0147709 | A1 | * | 10/2002 | Rajarajan et al. ............... 707/3 |
| 2003/0020671 | A1 | * | 1/2003 | Santoro et al. ............... 345/1.3 |
| 2003/0055655 | A1 | * | 3/2003 | Suominen .................... 704/276 |
| 2003/0144961 | A1 | * | 7/2003 | Tharaken et al. .............. 705/57 |
| 2003/0187932 | A1 | * | 10/2003 | Kennedy ..................... 709/205 |

OTHER PUBLICATIONS

"How to Create a PDF Document for Each Tab", The Apache Software Foundation, © 2002-2005, pp. 1-4 [downloaded from: http://forrest.apache.org/docs_0_70/howto-pdf-tab.pdf].*

(Continued)

*Primary Examiner*—Shahid Alam  
*Assistant Examiner*—Robert Stevens  
(74) *Attorney, Agent, or Firm*—Merchant & Gould

(57) ABSTRACT

Grouping pages of an electronic document into a series and displaying a title area for that series. The title area on the viewable area of a display screen whenever a page within a page grouping is displayed. The title area may contain editable document objects accessible while viewing any page in the page group. Some of these document objects may contain information derived from other computer programs, such as a scheduling program and information may be automatically placed into these document objects. The format of the title area may be customized and the entire title area may be hidden from view. Also, pages may be moved from one page group to another. These moved pages may be associated with the title area of the new page group, with the title area of the original page group inserted into the page as a document object.

18 Claims, 18 Drawing Sheets

OTHER PUBLICATIONS

Moseley, Lonnie E., et al (Mastering Microsoft Office 97, Professional Edition, 2nd Edition, Sybex, San Francisco, CA, (c) 1997, pp. 37-38, 145-151, 228-229, 428-430, 714-715 and 1072-1073.*

Sellers, Dennis, "Pageflex Release .EDIT Interactive Document Editor", Macworld, May 15, 2002, pp. 1-4 (downloaded from: www.macworld.com/news/2002/05/15/edit/index.php).*

Davis, Richard C., et al., "NotePals: Lightweight Note Sharing by the Group, for the Group", CHI '99, Pittsburgh, PA, May 15-20, 1999, pp. 338-345.*

Schilit, Bill N., et al., "Beyond paper: Supporting Active Reading with Free Form Digital Ink Annotations", CHI '98, Los Angeles, CA, Apr. 18-23, 1999, pp. 249-256.*

Frank, Martin R., et al., "Adaptive Forms: An Interaction Paradigm for Entering Structured Data", IUI '98, San Francisco, CA, © 1998, pp. 153-160.*

Price, Morgan N., et al., "Linking By Inking: Trailblazing in a Paper-like Hypertext", HyperText '98, Pittsburg, PA, © 1998, pp. 30-39.*

Wilcox, Lynn D., et al., "DYNOMITE: A Dynamically Organized Ink and Audio Notebook", CHI '97, Atlanta, GA, Mar. 22-27, 1997, pp. 186-193.*

Moran, Thomas P., et al., "Pen-Based Interaction Techniques for Organizing Material on an Electronic Whiteboard", UIST '97, Banff, Alberta CA, ©1997, pp. 45-54.*

Schilit, Bill N., et al., "Digital Library Information Appliances", Digital Libraries '98, Pittsburgh, PA, © 1998, pp. 217-226.*

Girgensohn, Andreas, "Supporting the Writing of Reports in a Hierarchical Organization", WACC '99, San Francisco, CA, Feb. 1999, pp. 147-156.*

* cited by examiner

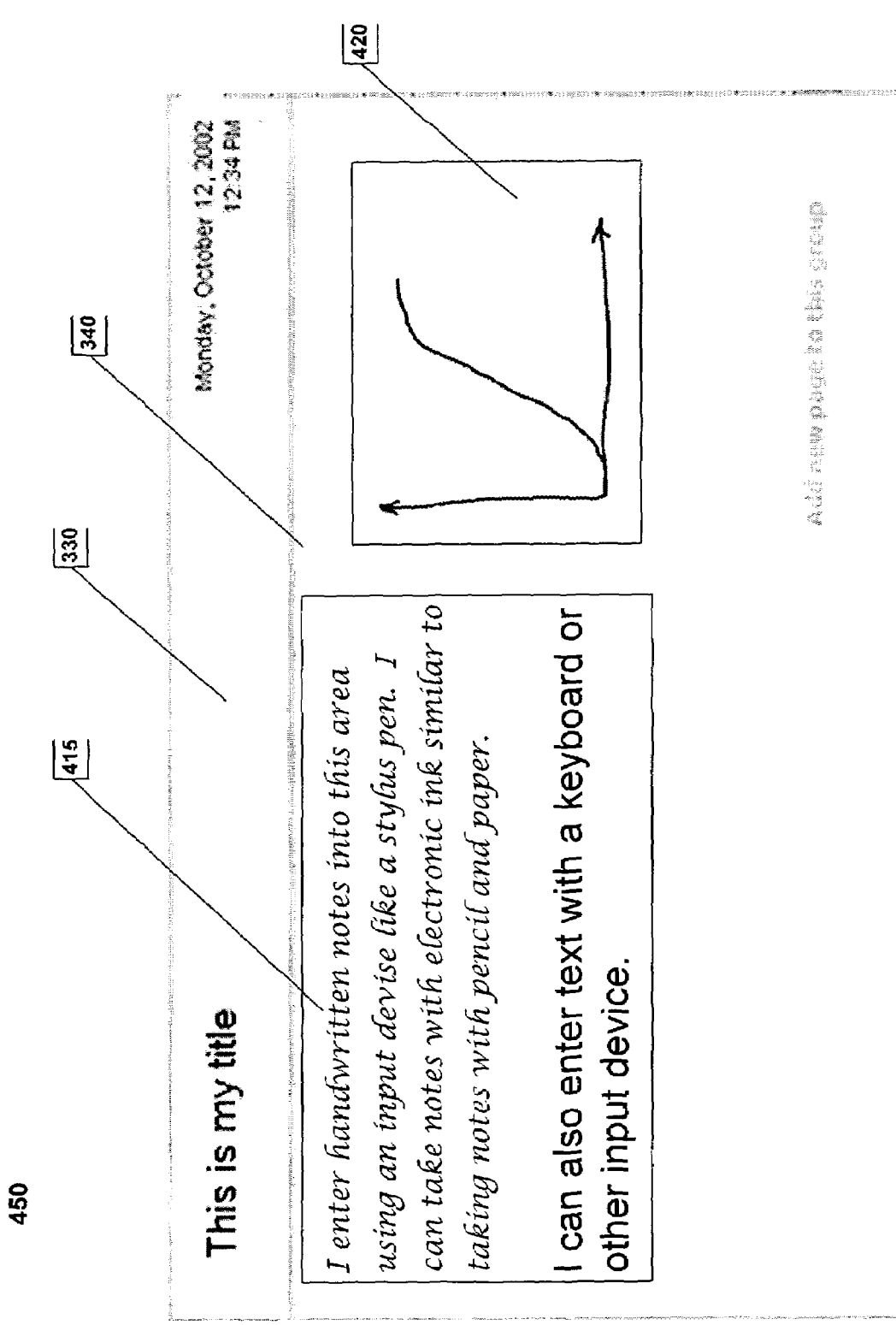

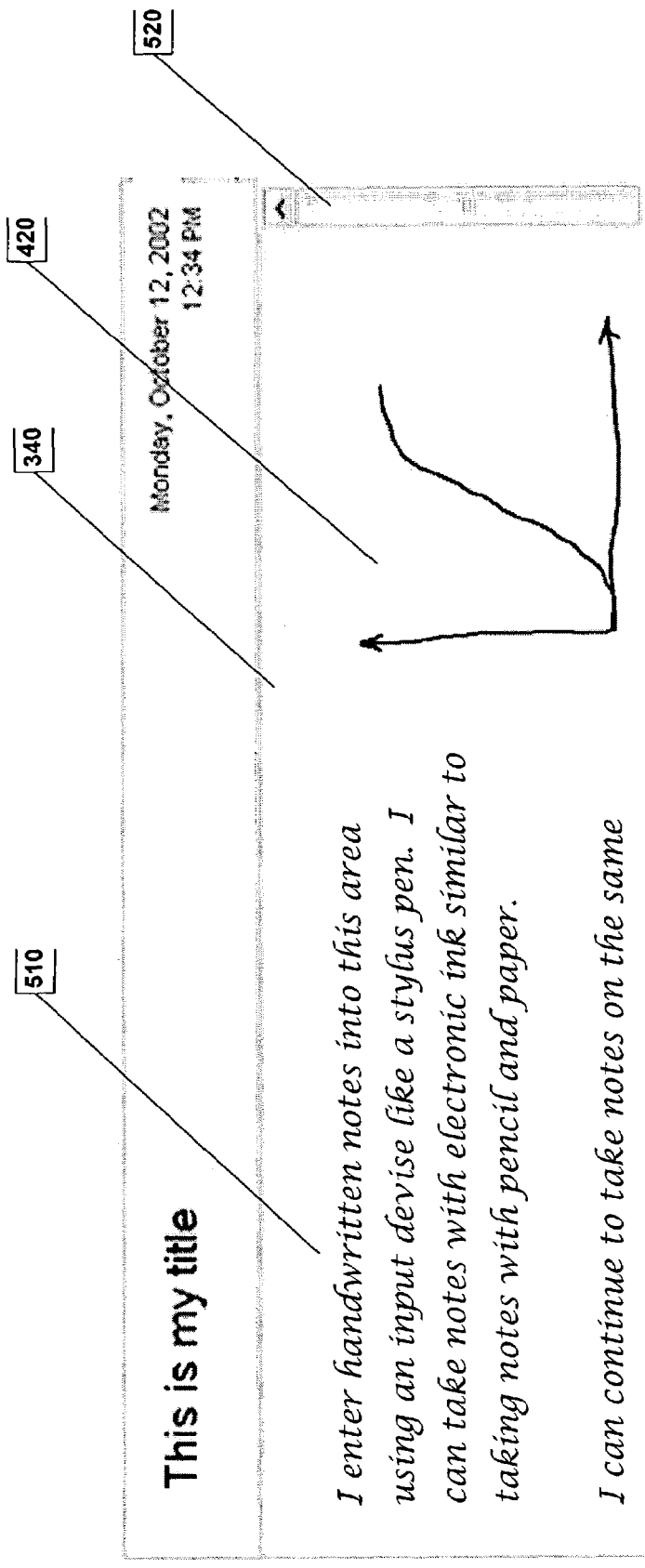

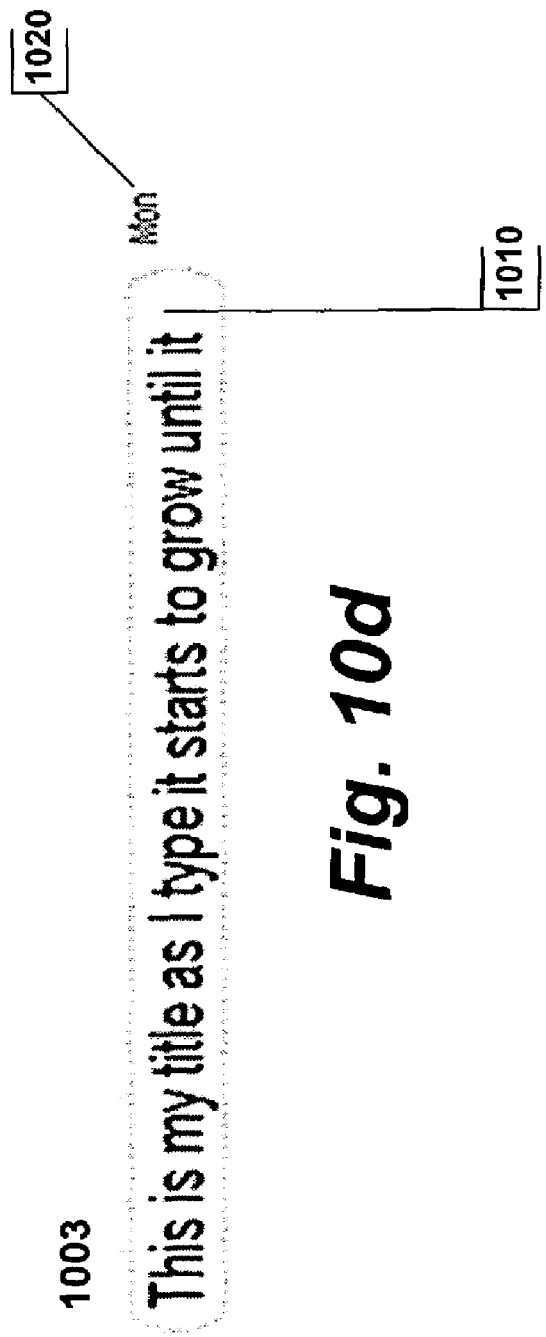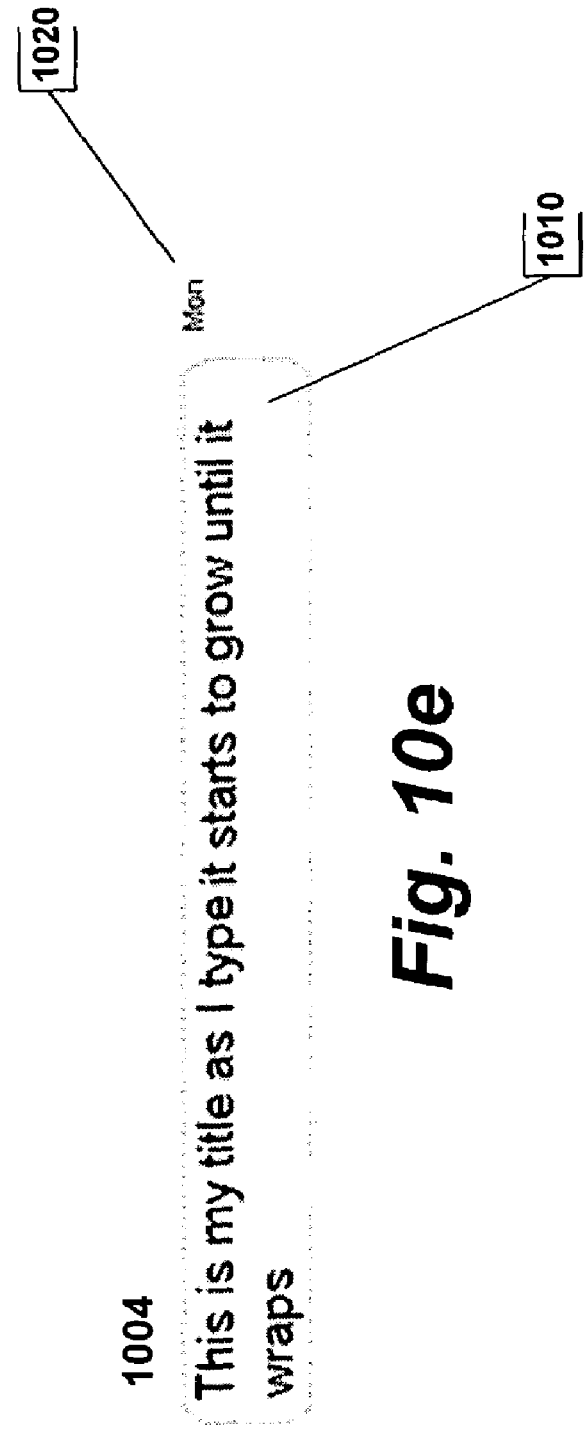

METHOD AND SYSTEM FOR DISPLAYING A TITLE AREA FOR A PAGE SERIES

RELATED PATENT APPLICATIONS

This patent application is related to the following co-pending non-provisional patent applications: U.S. patent application Ser. No. 09/852,799 filed on May 11, 2001, entitled "Serial Storage of Ink and Its Properties" and U.S. patent application Ser. No. 09/430,150 filed on Oct. 29, 1999, entitled "Universal File Format for Digital Rich Ink Data." Both related applications are assigned to Microsoft Corporation.

This patent application is also related to the following non-provisional patent applications: U.S. patent application Ser. No. 10/186,388, entitled "Writing Guide for a Free-Form Document Editor"; U.S. patent application Ser. No. 10/186,847, entitled "Method and System for Editing Electronic Ink"; U.S. patent application Ser. No. 10/186,874, entitled "Method and System for Selecting Objects on a Display Device"; U.S. patent application Ser. No. 10/186,812, entitled "Resolving Document Object Collisions"; U.S. patent application Ser. No. 10/186,837, entitled "Space Management for Electronic Documents"; U.S. patent application Ser. No. 10/186,865, entitled "System and Method for Automatically Recognizing Electronic Handwriting in an Electronic Document and Converting to Text"; U.S. patent application Ser. No. 10/186,820, entitled "Method and System for Designating Data Objects with Designation Tools"; U.S. patent application Ser. No. 10/186,463, entitled "Method and System for Displaying and Linking Ink Objects with Recognized Text and Objects". These applications were filed on Jun. 28, 2002 and are assigned to Microsoft Corporation.

The subject matter of each of these applications is hereby fully incorporated by reference.

FIELD OF THE INVENTION

The present invention relates to creating electronic documents and more specifically relates to organizing pages using a free-form document editor by grouping pages together or providing a common title area for grouped pages.

BACKGROUND OF THE INVENTION

Electronic document editors are widely used in homes and businesses today. Familiar examples of these editors include word processing applications that operate on personal computers (PCs) and note-taking applications that operate on personal data assistants (PDAs). These applications strive to replace paper as the simplest means to record and communicate information. However, to replace and enhance paper's utility, the electronic document editor must allow the user to place document objects on a page and to edit, move, resize, and add objects, while ensuring that the user can clearly view the individual objects.

Note-taking using a free-form document editor can be enhanced by using certain hardware devices. For example, an electronic tablet can be used to record handwriting and input the handwriting to a conventional computer. Such electronic tablets typically comprise a screen and a handheld device that is similar to a pen (also referred to as a stylus). A user can use the pen to write on the electronic tablet in a manner similar to using traditional pen and paper. The electronic tablet can "read" the strokes of the user's handwriting with the handheld device and render the handwriting in electronic form on the tablet's screen or the computer's display as "electronic ink." Additionally, the user can create a drawing or text onto blank areas on the page using the stylus and electronic tablet or using a keyboard, pointing device, or other input device. These areas of text or images are called document objects.

Typically, people who take notes using paper and pencil need to organize the notes on a given subject. Prior art solutions may include taking notes in a dedicated, bound paper notebook using a pen or pencil, taking notes on individual sheets of paper and then combining those sheets in a notebook or similar organizer or joining the pages with a staple or paper clip, or typing the notes into a word processing document.

Each of these prior art solutions have weaknesses. In a bound paper notebook, notes typically must be taken in chronological order. Individual pages typically cannot be associated with other pages at different locations in the notebook. Also, the note-taker would need to constantly turn back to previous pages to refer to an important section of notes, such as action items or questions or an agenda. This task is made even more difficult if the questions or action items are scattered about the notes, for example, if the questions or action items were discussed during a meeting at different times and were recorded with the notes taken during those times.

By using individual pieces of paper and combining them at a later time, a note-taker may overcome some of these problems. A staple or paper clip can be used to organize notes from a single group or series. Also, individual sheets of paper can be separated from one group and added to another. However, this approach is still restricted by the limitations of traditional paper and pencil note-taking. The documents cannot be readily edited and small sections of text cannot be incorporated into other notes, except a page at a time. Also, the note-taker is limited to the actual size of the paper when taking notes. She does not have the capability of adjusting the page's size as she takes notes. Also, she cannot readily search the notes for a key word or phrase. Finally, in order to refer to notes grouped together in groups other than the one she is working on, she would need to carry the individual stapled or clipped packets of paper.

Word processing software overcomes some of the weaknesses of taking notes with pencil and paper. Laptop computers and PDAs make note-taking anywhere almost as convenient as paper and pencil. The resulting notes can be searched for key words and phrases and discrete sections of text can be cut from one section of notes and moved to another. Still, with typical word processing software, a note-taker would have difficulty referring back to notes taken earlier in a note-taking session, similar to the difficulty with a bound paper notebook. Also, word processing software is one-dimensional. In other words, information is added to a page in one direction. For example, words are added to a line of text. When the line reached the right edge of a page, the text moves down to start a new line. This progression repeats, always moving in one direction, down the page. Finally, word processing software has fixed page sizes. The page cannot readily be expanded in width or length to accommodate a specific type of information, as may be desired when taking notes.

What is needed is a document editor that can group and ungroup individual pages together. The editor needs to have the advantages of a free-form document editor. What is also needed is a method for a free-form document editor to incorporate an area onto the viewing area of a document page that contains information that can be viewed regardless of which page within a group of pages is viewed.

SUMMARY OF THE INVENTION

The present invention enables the grouping of a series of pages generated by a document editor into a common series. The present invention also supports the viewing of document objects within an area regardless of the page within a series of pages that is being viewed.

A title area can be maintained on the viewable area of a display screen whenever a page within a page grouping is displayed. The title area may contain editable document objects accessible while viewing any page in the page group. Some of these document objects may contain information derived from other computer programs, such as a scheduling program and information may be automatically placed into these document objects. The size and format of the title area may be customized and the entire title area may be hidden from view.

Also, pages may be moved from one page group to another. These moved pages may be associated with the title area of the new page group, with the title area of the original page group inserted into the page as a document object.

The aspects of the present invention may be more clearly understood and appreciated from a review of the following detailed description of the disclosed embodiments and by reference to the drawings and claims.

BRIEF DESCRIPTION OF THE DRAWINGS

FIG. 4b is a display image showing document objects on a page area in accordance with an exemplary embodiment of the present invention.

FIG. 5 is a display image showing document objects on a page area where one object exceeds the viewing area of the page in accordance with an exemplary embodiment of the present invention.

FIGS. 10a-10e are images of an exemplary title area illustrating entering a title into a title object within the title area.

DETAILED DESCRIPTION OF THE EXEMPLARY EMBODIMENTS

Exemplary embodiments of the present invention support the organizing of a free-form electronic document, by grouping and ungrouping pages within a series of pages and including a viewable area that can display document objects when any page within a series is viewed.

Figure 1:
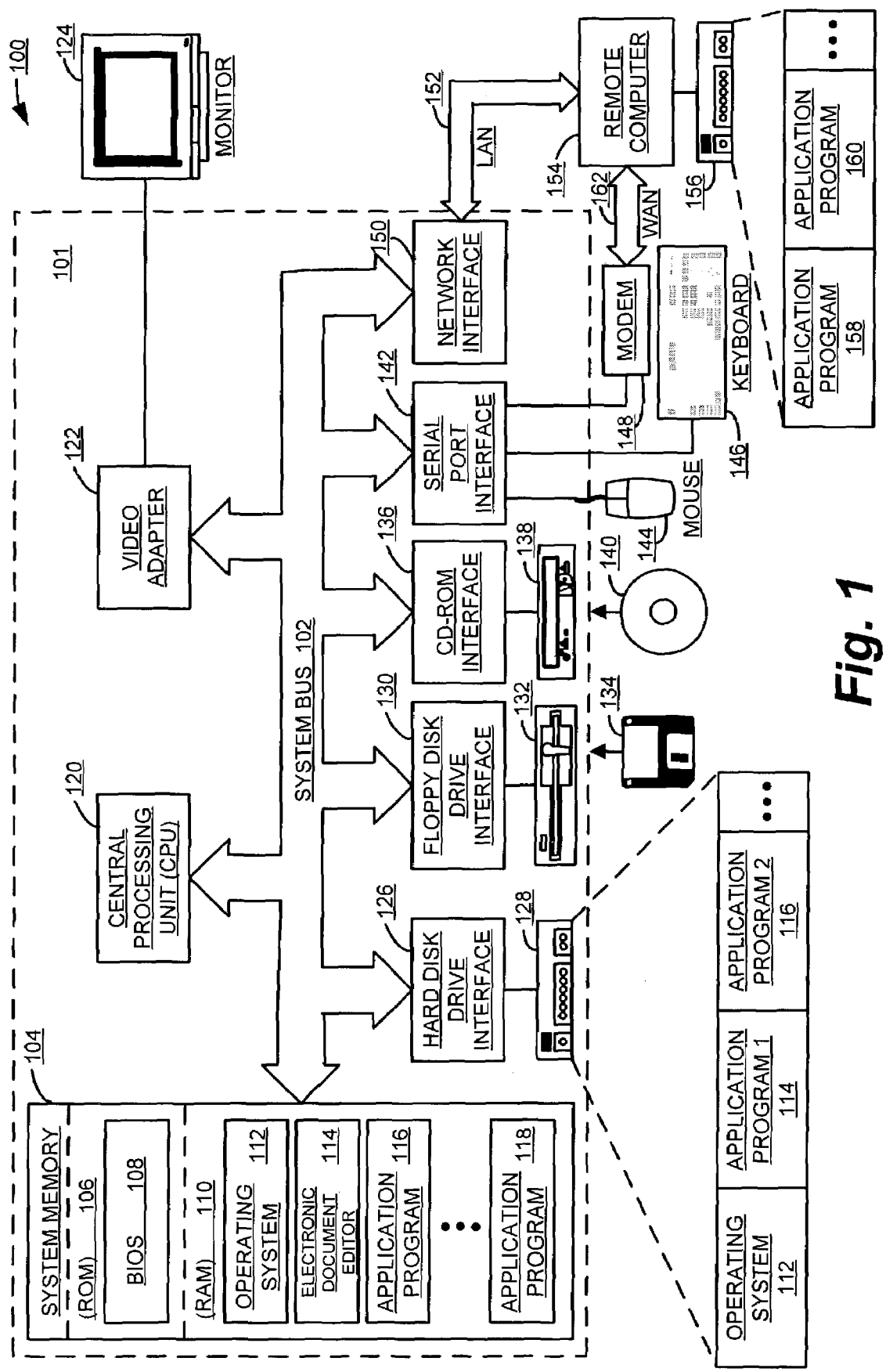
FIG. 1 is a block diagram illustrating a representative operating environment for an exemplary embodiment of the present invention.

FIG. 1 illustrates a representative operating environment 100 for an exemplary embodiment of the present invention. This representative operating environment includes a general-purpose computing device in the form of a conventional personal computer 101. Generally, the personal computer 101 includes a processing unit 120, a system memory 104, and a system bus 102 that couples system components including the system memory 104 to the processing unit 120. The system bus 102 may be any of several types of bus structures including a memory bus or memory controller, a peripheral bus, and a local bus using any bus architecture. The system memory includes a read-only memory (ROM) 106 and a random access memory (RAM) 110. A basic input/output system (BIOS) 108, containing the basic routines that help to transfer information between elements within personal computer 101, such as during start-up, is stored in ROM 106.

Personal computer 101 further includes a hard disk drive 128, a floppy disk drive 132 for reading from or writing to a removable magnetic disk 134, and an optical disk drive 138 for reading from or writing to a removable optical disk 140 such as a CD-ROM or other optical media. Hard disk drive 128, magnetic disk drive 132, and optical disk drive 138 are connected to system bus 102 by a hard disk drive interface 120, a floppy disk drive interface 130, and a CD-ROM disk drive interface 136, respectively. Although the exemplary environment described herein employs hard disk 128, removable magnetic disk 134, and removable optical disk 140, it should be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the exemplary operating environment. The drives and their associated computer-readable media provide nonvolatile storage of computer-executable instructions, data structures, program modules, and other data for personal computer 101.

A number of program modules may be stored on hard disk 128, magnetic disk 134, optical disk 140, ROM 106, or RAM 110, including an operating system 112, an electronic document editor 114, and multiple application programs 116-118. Program modules typically include routines, subroutines, programs, objects, components, data structures, etc., that perform particular tasks or implement particular abstract data types.

A user may enter commands and information into personal computer 101 through input devices, such as a keyboard 146 and a pointing device, such as mouse 144. Pointing devices may also include a trackball (not shown) and an electronic pen (not shown) that can be used in conjunction with an electronic tablet or a typical display screen. Other input devices (all not shown) may include a microphone, joystick, game pad, satellite dish, scanner, or the like. These and other input devices are often connected to processing unit 120 through a serial port interface 142 that is coupled to the system bus 102, but may be connected by other interfaces, such as a parallel port, game port, a universal serial bus (USB), or the like. A display device, such as monitor 124, may also be connected to system bus 102 via an interface, such as a video adapter 122. In addition to the monitor, personal computers typically include other peripheral output devices (not shown), such as speakers and printers.

The personal computer 101 may operate in a networked environment using logical connections to one or more remote computers 154. Remote computer 154 may be another personal computer, a server, a client, a router, a network PC, a peer device, or other common network node. While a remote computer 154 typically includes many or all of the elements described above relative to the personal computer 101, only a memory storage device 156 has been illustrated in FIG. 1. The memory storage device 156 may include application program 158 and application program 160. The logical connections depicted in FIG. 1 include a local area network (LAN) 152 and a wide area network (WAN) 162. Such networking environments are commonplace in offices, enterprise-wide computer networks, intranets, and the Internet.

When used in a LAN networking environment, the personal computer 101 is often connected to the local area network 152 through a network interface or adapter 150. When used in a WAN networking environment, the personal computer 101 typically includes a modem 148 or other means for establishing communications over WAN 162, such as the Internet. Modem 148, which may be internal or external, is connected to system bus 102 via serial port interface 142. It will be appreciated that the network connections shown are exemplary and other means of establishing a communications link between the computers may be used.

Moreover, those skilled in the art will appreciate that the present invention may be implemented in other computer system configurations, including PDAs, electronic writing tablets, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
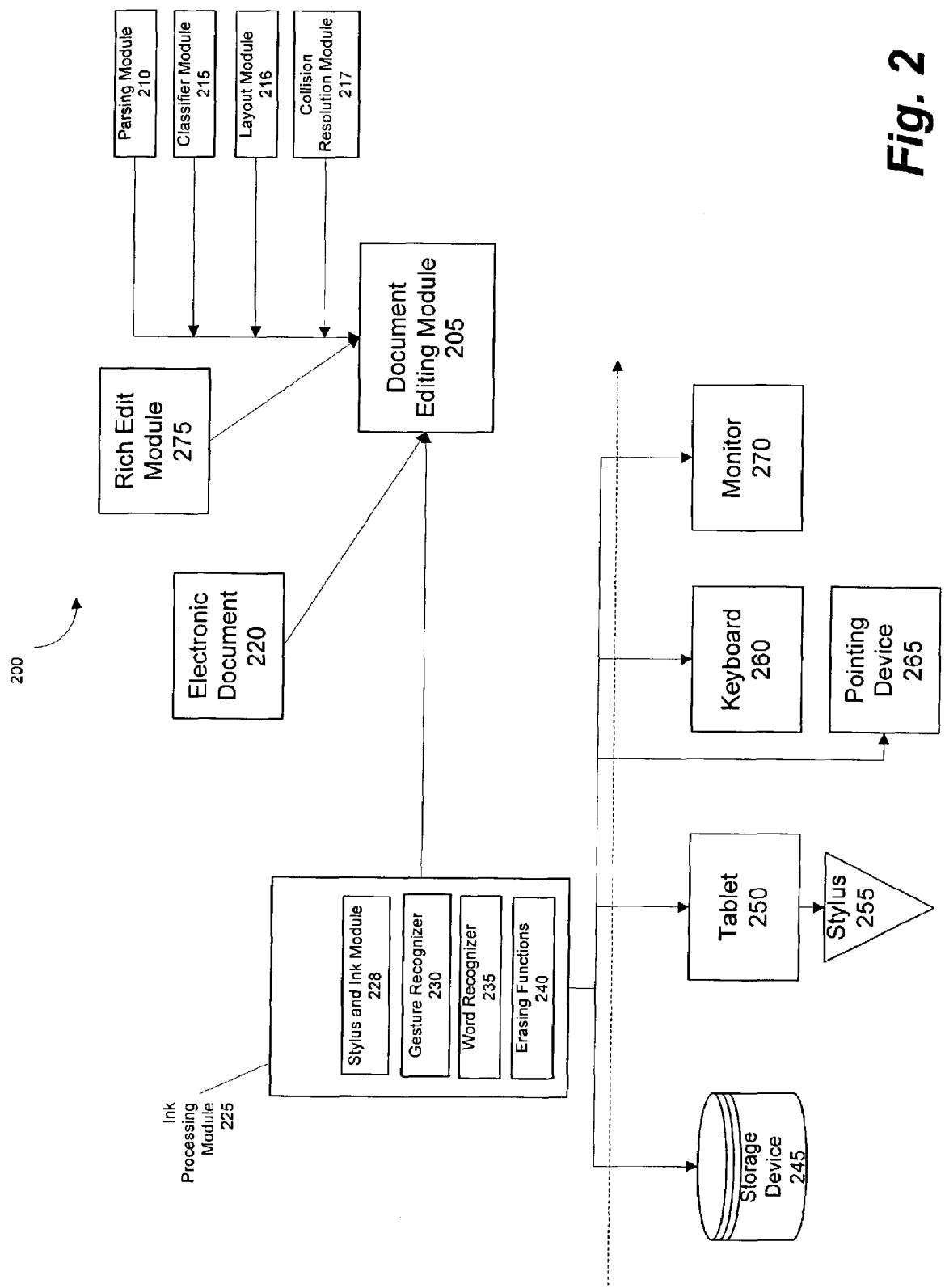
FIG. 2 is a block diagram depicting the primary functional components of an exemplary free-form document editor and related input devices.

FIG. 2 is a block diagram depicting the primary functional components of an exemplary free-form document editor and related input devices for the representative operating environment of an electronic writing tablet, otherwise described as an electronic tablet. Specifically, FIG. 2 depicts an architecture 200 for an electronic writing tablet in the context of a free-form document editor constructed in accordance with an exemplary embodiment of the present invention. Conventional input devices are represented by the keyboard 260 and the pointing device 265 (e.g., mouse, pen (or stylus) and tablet). Other output devices (not shown) can include a printer or speaker. Other hardware components shown in FIG. 2 include an electronic tablet 250 and an accompanying stylus 255. The tablet 250 and stylus 255 are used to input handwriting strokes that can be converted to data, referred to as electronic ink. The electronic ink may be incorporated into an electronic document 220 and may be displayed on either the electronic tablet 250, the monitor 270, or both. Although the electronic tablet 250 and the monitor 270 are illustrated as being distinct, in an exemplary embodiment of the present invention, they can be integrated into a single component. The joint tablet/monitor component has the ability to display information and receive input from the stylus 255.

In the representative architecture 200, an ink-processing module 225 is operable to receive data from the electronic tablet 250 and to render that data as electronic ink. In one embodiment of the present invention, the ink-processing module 225 can be a collection of software modules that perform different tasks for rendering handwriting strokes as electronic ink. For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink-processing module 225 can also include an erasing functions module 240 for removing electronic ink that has been previously rendered.

Although ink processing modules are known in the art and necessary for an electronic tablet to function, a novel document editing module has been developed by Microsoft Corporation of Redmond, Wash. that capitalizes on the benefits of handwriting processing technology. The module (i.e., document editor) is a free-form document editor that leverages the functionality of electronic handwriting technology to enable more effective and efficient note taking. Specifically, document editing module 205 facilitates manipulating electronic ink so that a user can create and modify an electronic document 220 with greater ease and sophistication. The document editing module 205 typically comprises a collection of software modules for controlling and manipulating electronic ink rendered on the monitor 270. For example, a parsing module 210 can be used to identify handwriting strokes that are selected by the user for editing. Selected strokes may by highlighted or shaded to assist the user in identifying which strokes are to be edited. A classifier module 215 can identify certain handwriting strokes as being part of a word or drawing and may designate document objects accordingly. Software modules such as the layout module 216 and the collision resolution module 217 can be designed to control how objects move about a page.

Exemplary embodiments of the present invention relate most directly to managing pages in an electronic document 220. FIGS. 1 and 2 provide a general overview of the environments in which the inventors contemplate exemplary embodiments of the present invention will be used.

Figure 3:
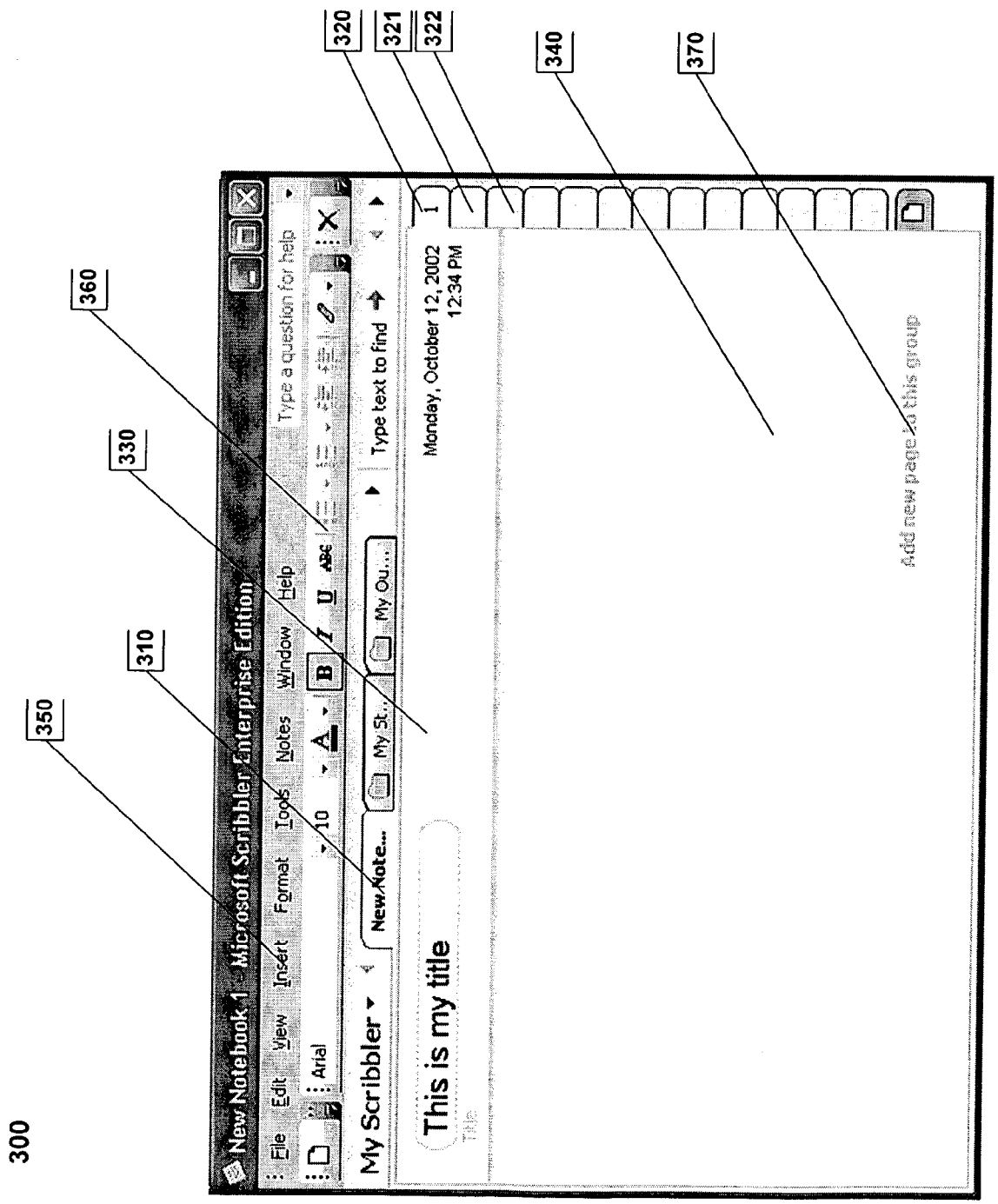
FIG. 3 is a display image showing a title area and page series in accordance with an exemplary embodiment of the present invention.

FIG. 3 is a display image 300 for a free-form document editor constructed in accordance with an exemplary embodiment of the present invention. Referring now to FIGS. 2 and 3, a tab 310 illustrates an exemplary file organization scheme, termed a notebook in this embodiment. When the tab 310 is activated, for example, with the pointing device 265, a display screen gives a user access to one or more page groups 320, 321, 322.

A page group, also referred to herein as a page series, is a group of one or more document objects. The page group may comprise the document objects that a note-taker or other user wishes to group together. These document objects could comprise multiple pages or a single page. For example, these objects may all be notes taken at a business meeting or a single class at school. With certain free-form electronic document editors, the notes could be taken on multiple pages or a single page, where the size of the page could be adjusted to accommodate any number or size of document objects. In an exemplary embodiment, a page group shares a common title area. In other words, when any of the pages within a group are displayed, the same title area information can be displayed. Likewise, for the display of a single page comprising a page group of document objects, the same title information is continuously displayed in connection with the presentation of a document object for that page group.

A title area 330 provides one or more document objects that can be displayed when any page in a page group is displayed. These objects may either be generated automatically by the document editing module 205 or added by a user. These objects may be fixed in a position in the title area 330 or placed in a position determined by a user. The image 300 depicts the title area 303 over a page area 340. One skilled in the art should appreciate that the title area 330 could be positioned anywhere relative to the page area 340, such as below the page area 340, without deviating from the scope of this invention. The layout of the title area 330 is discussed in greater detail below, in conjunction with FIGS. 9-15.

A title area associated with a group of pages provides a viewable area on a display, or output, screen that can contain document objects. These objects may be edited as any object might by a user. The title area can be seen regardless of the page within a group of pages that is being viewed or edited at the time. This area allows a user to have access to information readily, without having to move to a portion of a page or to another page within the same page group that is not presently being viewed. Different page groups can have different document objects within the title area.

Also, a title area differs from a header or footer feature typically available in word processing programs, such as the "WORD" program, from Microsoft Corporation of Redmond, Wash. Headers and footers are typically used to put the same material in the top or bottom margin regions of printed pages. Headers and footers are typically not continually viewable along with a page area of a document when viewing an output screen of the document. In other words, typically, word processing programs do not ensure that headers and footers are displayed in the viewable area of a display screen at all times when a user is inputting objects onto a page. Instead, a header may be viewable only when the top of a page is displayed. As the user works down a page, the top of the page scrolls off the screen. Similarly, a footer comes into view only as a page scrolls to the bottom. Also, the format of the display of a header or footer is often different than the display of document objects on the main portion of a page, with the header or footer appearing lighter, or less distinct, than the main portion of a page.

In contrast, title areas can be readily viewable along with the page area of a document. A purpose for continually displaying a title area within the viewable region of a display screen is so a user will have constant access to the information contained in the title area as well as the ability to constantly update and add to the title area. In other words, a header or footer serves the purpose of placing the same or similar information on one or more printed pages. A title area can serve the purposes of displaying certain information to a user at all times and providing a region on a viewable display area that a user can input information regardless of the page within a page group being displayed.

The page area 340 also accepts document objects. These objects may include handwritten notes generated using an electronic ink input device, such as the stylus 255 attached to the tablet 250. The document objects may also include pictures, perhaps generated by the stylus 255 and the tablet 250, or other objects generated with the keyboard 260 or other input device. The document objects and format of the page group 320, title area 330, and page area 340 can be changed by a user either through a menu system 350 or toolbar 360 or other method, such as one or more keystrokes.

A user can move between page groups 320, 321, 322 by using a pointing device 265 to activate the tab associated with that page group. Pointing at a tab may also indicate individual pages within a page group and a user may be able to move directly to a desired page in a page group. In an alternative embodiment, page group tabs 320, 321, 322 could be of a consistent size and different size tabs, perhaps smaller than page group tabs 320, 321, 322, visible under a page group tab, could link the user to individual pages within a page group.

In the exemplary embodiment, continuation pages can be added to a page group. For example, while taking notes at a business meeting, the user may wish to continue the notes on a new page. In an exemplary free-form document editor, the user can extend the size of a page to any size desired. However, a user may wish to continue onto a new page, while still grouping the new page with previous pages. One way to add a continuing page in the exemplary embodiment is through the command icon 370. This command icon 370 may indicate "Add new page to this group," and may appear at the end of a current page. This command icon 370 allows the user to use a pointing device 265 to actuate the icon and add a new page. One skilled in the art would appreciate that the command icon 370 can take on a variety of appearances and be placed in a variety of locations on a display screen.

Figure 4A:
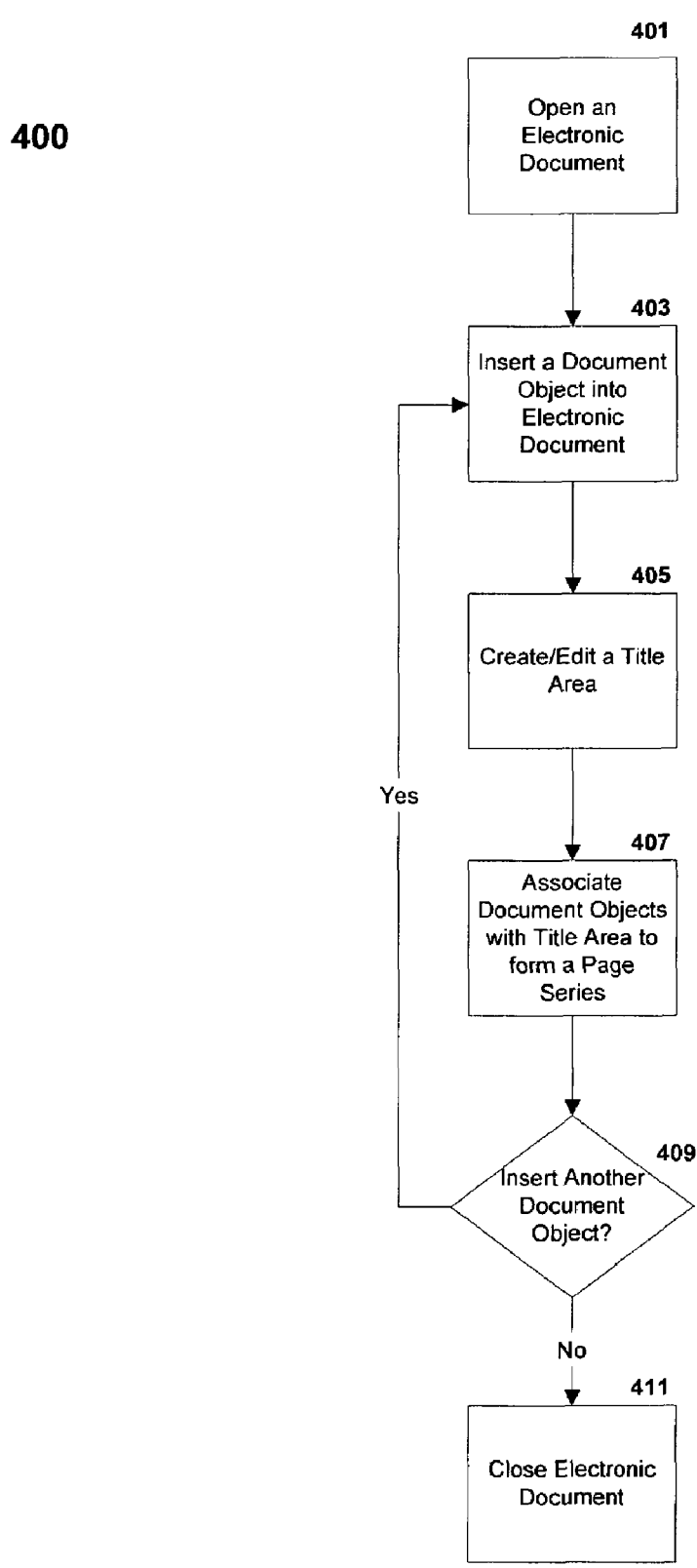
FIG. 4a is a flow diagram presenting a process for associating document objects with a title area to form a page group in accordance with an exemplary embodiment of the present invention.

FIG. 4a is a flow diagram presenting a process 400 for associating document objects with a title area to form a page group in accordance with an exemplary embodiment of the present invention. At step 401, an electronic document is opened, for example with a free-form document editor or another computer application program for editing electronic documents. At step 403, a document object is inserted somewhere on a page within the electronic document. This document object can be text, an image, or another object, such as a link to a different document or software application. Text document objects can be inserted using a keyboard 260 (FIG. 2) or a stylus 255 (FIG. 2) in connection with electronic ink, or similar method known in the art for inserting text objects into an electronic document editor.

One document object may comprise multiple pages or many document objects may be placed on a single document page. The free-form document editor may allow the document page to increase in size in any direction to accommodate one or more document objects.

At step 405, a title area is created or edited. A document object may be inserted into the title area, either by the user or automatically by the electronic document editor. At step 407, the document object that has been inserted onto a document page is associated with the title area, forming a page series or group. This association can be performed automatically by the electronic document editor or by a user action, such as selecting a menu item or by performing a keystroke or series of keystrokes. By associating the document object with the title area, the title area can be viewed on an output screen when the electronic document is being viewed, regardless of the section of the document being viewed on the output screen. For example, an output screen may be sized to show a portion of a single document page, while a document object could comprise multiple pages. After the document object and title area are associated, the user can move about the document, viewing portions of the document object. Regardless of what portion of the document object is being viewed, the user may see the title area and the document objects inserted into the title area.

At step 407, the process determines if another document object is to be inserted. If so, the process returns to step 403 and repeats. Otherwise, it moves to step 411 and the electronic document is closed.

FIG. 4b is a display image 450 showing document objects on a page area 340 in accordance with an exemplary embodiment of the present invention. Referring to FIG. 4, document object 415 may contain handwritten text or may contain text input using a keyboard or other input device, such as a microphone linked to a voice recognition software module. This object may grow as additional text is added to the object. Document object 420 shows a picture and the picture may be rendered using electronic ink. The exemplary embodiment can support any type of document object in the page area 340, including text, pictures, and other objects typically used in electronic documents. The document objects 410, 420 can be contained entirely in page area 340 and not overlap into title area 330.

FIG. 5 is a display image 500 showing document objects on a page area 340 where one object exceeds the viewing area of the page in accordance with an exemplary embodiment of the present invention. Referring to FIG. 5, a document object 510, which is similar to document object 410 (FIG. 4), but with added text, exceeds the length of the viewing area of the page shown in image 500. The viewing area of the page shown in image 500 differs from a page area 340, in that page area 340 may extend beyond the boundary of the viewing area of the page of image 500. In the exemplary embodiment, when a document object extends beyond the visual area, a scroll bar 520 appears on the viewing area. In the display image 500, the document object 510 extends beyond the bottom of the viewing area, so the scroll bar 520 is oriented vertically and appears on the right of the screen. One skilled in the art would appreciate that if a document object extended beyond the right or left edges of the viewing area, a horizontal scroll bar could be used. Also, the vertical scroll bar 520 could be positioned on the left side of the viewing area.

Figure 6:
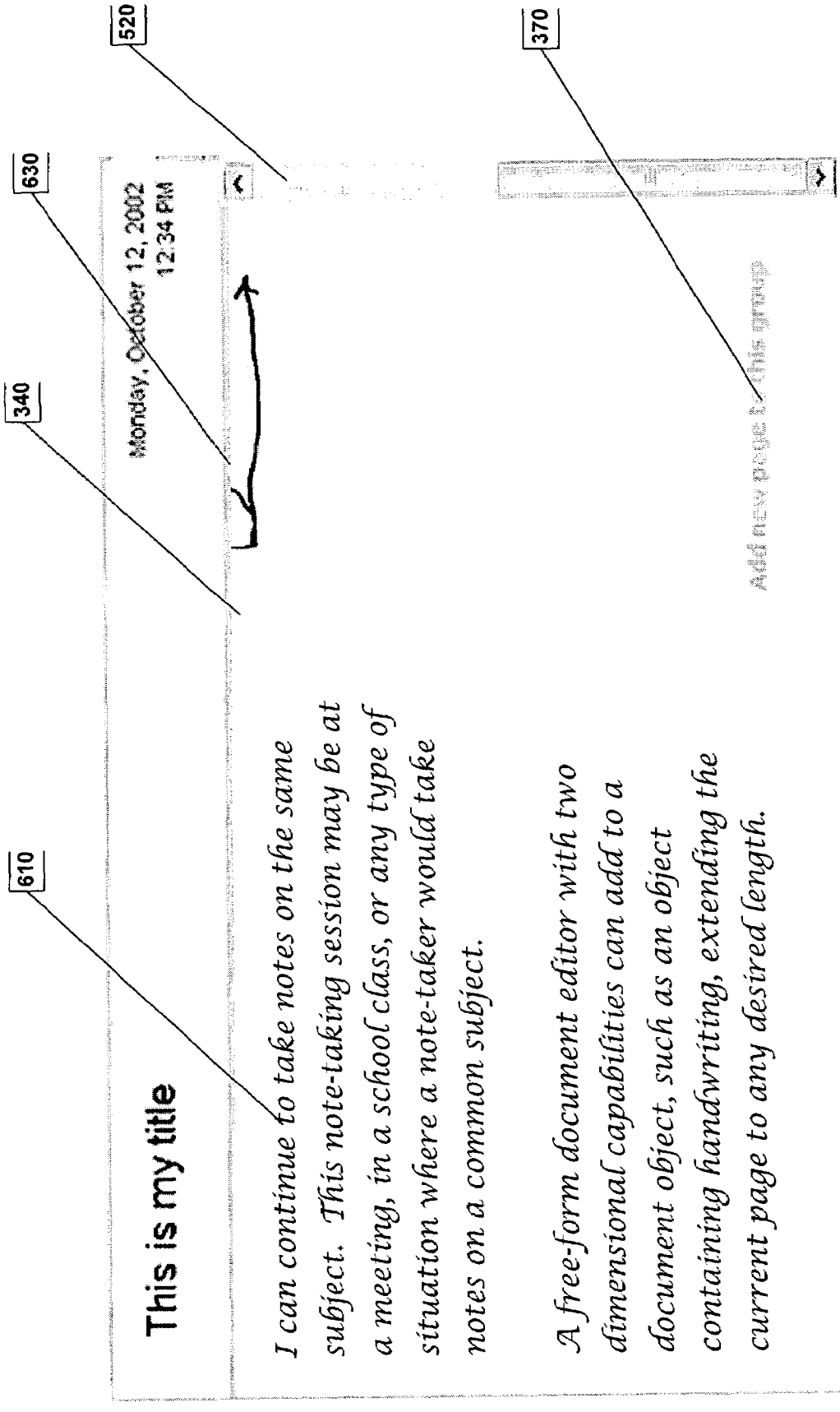
FIG. 6 is a display image showing document objects on a page area where one object exceeds the viewing area of the page and the page has been scrolled down to see the remainder of the object in accordance with an exemplary embodiment of the present invention.

FIG. 6 is a display image 600 showing document objects on a page area 340 where one object exceeds the viewing area of the page and the page has been scrolled down to see the remainder of the object in accordance with an exemplary embodiment of the present invention. The display image 600 is similar to the display image 500, in that it presents the same document objects. Referring to FIG. 6, a document object 610 shows the bottom of a document object that contains text, such as handwritten notes. A scroll bar 520 has been moved to the lowest vertical extent, indicating that the bottom of the current page area 340 has been reached. Document object 630 shows the bottom of document object 420 (FIG. 4), in other words, it shows how document object 420 (FIG. 4) looks with the page area 340 moved to the lowest vertical extent. Also shown is the control icon 370, which can be used to add a continuation page to this page group.

Figure 7:
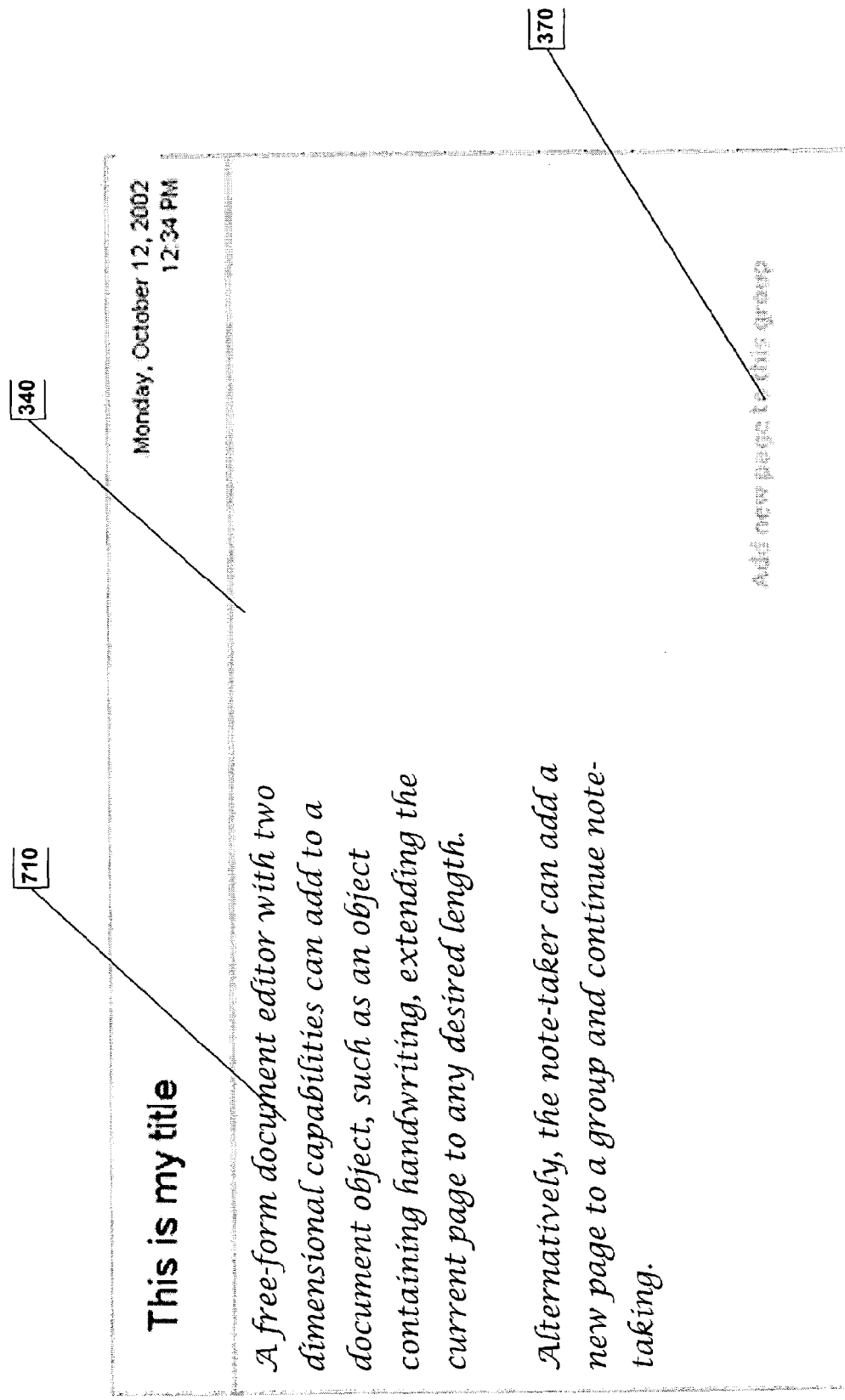
FIG. 7 is a display image showing a document object on a continuation page in accordance with an exemplary embodiment of the present invention.

One skilled in the art would appreciate that the ability to scroll about a page gives a user the flexibility of adding pages to a page group that are of the size of the viewing area of page area 340 or have pages of varying size within a common page group. FIG. 7 is a display image 700 showing a document object on a continuation page in accordance with an exemplary embodiment of the present invention. Referring to FIGS. 5 and 7, a document object 710 contains text, such as handwritten notes. The document object 710 is an example of inserting a continuation page after the first two paragraphs of text were entered into the document object 510. In this example, the user would have all of document object 420 (FIG. 4) and the first two paragraphs of document object 510 on one page area 340 and the entire page area 340 would be totally within the viewing area of page. The document object 710 would then be on a continuation page within the same page group, again totally within the entire viewing area of the continuation page. This configuration provides an example of a page group that enables the user to see an entire set of document objects within a page group by moving from one page to another without having to scroll to areas on a page that are outside the viewing area of the page. This configuration is analogous to a bound notebook, where a note-taker can flip from page to page and see the entire content of the notes.

Figure 8:
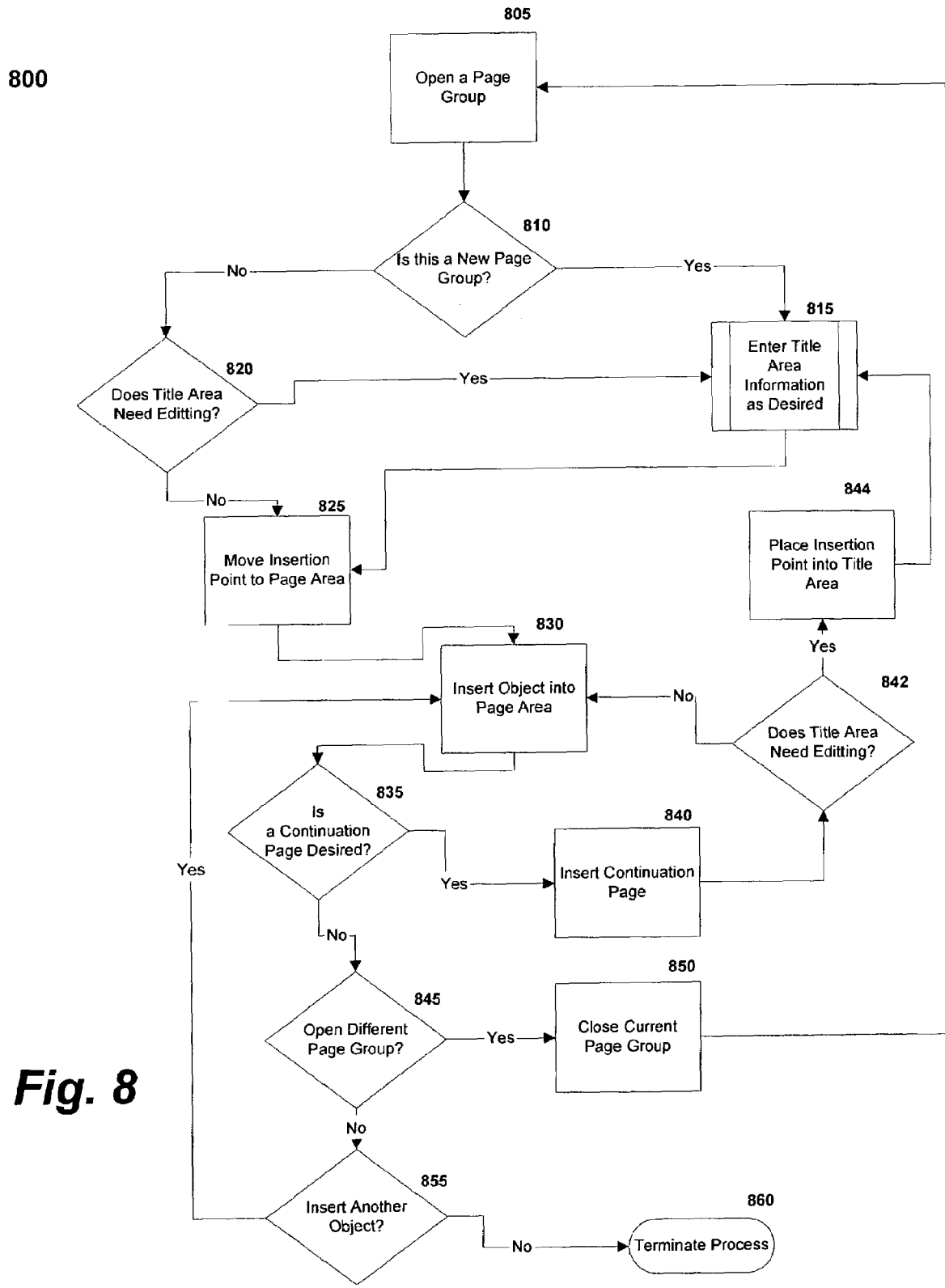
FIG. 8 is a flow diagram presenting a process for document editing using a page group in accordance with an exemplary embodiment of the present invention.

FIG. 8 is a flow diagram presenting a process 800 for document editing using a page group in accordance with an exemplary embodiment of the present invention. Referring to FIG. 8, at step 805 a page group is opened. At step 810, the process 800 determines if the opened page group is new or existing. If the page group is new, title information is edited at step 815. This step is discussed in greater detail below in association with FIG. 14. If the page group is existing, a decision is made at step 820 as to whether to edit the title area. If the title area information is to be edited, the process 800 moves to step 815 and the information is edited as desired. The process 800 then moves to step 825, where an insertion point (IP) is placed into the page area. At step 830, a document object is inserted into the page at the IP. This document object can be text, an image, or another object, such as a link to a different document or software application. Text document objects can be inserted using a keyboard or electronic ink, or similar method known in the art for inserting text objects into a document editor.

At step 835, the user determines if a continuation page is desired. If so, a continuation page is inserted into the page group at step 840. This step can be accomplished by using a pointing device and an insertion icon or menu item or through a keystroke or series of keystrokes on a keyboard or other method, such as voice activation. One skilled in the art would appreciate that any method known in the art for inserting an additional page into a document can be used to add a continuation page. Once the continuation page is inserted, the user determines if the title area needs editing at step 842. If not, the user can insert an object onto the page area of the continuation page at step 830.

If the title area needs to be edited, the user moves the IP to the title area at step 844. Then, the process 800 moves to step 815, where the title area information is added and continues from step 815 as described above.

If a continuation page is not desired, the process determines if the user wants to open a different page group at step 845. If so, the current page group is closed at step 850. In the exemplary embodiment, step 850 is accomplished by the electronic document editor software. This step can be accomplished by using a pointing device and a close document icon or menu item or through a keystroke or series of keystrokes on a keyboard or other method, such as voice activation. One skilled in the art would appreciate that any method known in the art for closing a document can be used to close a page group. Then, the process returns to step 805 and repeats.

If, at step 845 a different page group is not to be opened, the process moves to step 855 and determines if another object is to be inserted into the current page group. If "Yes," the process returns to step 830. Otherwise, the process moves to step 860 and terminates.

One skilled in the art would appreciate that process 800 has been depicted as a series of events for illustrative purposes. Many steps requiring user interaction can occur in parallel. For example, a user may open a page group and begin by inserting a document object into a page, without thinking about whether to modify the title area. Similarly, the title area may be edited after an object has been inserted into the page area. Also, the user may exit the page group after the document object is inserted. The process 800 illustrates the types of choices a user has with an exemplary embodiment of the present invention.

Figure 9:
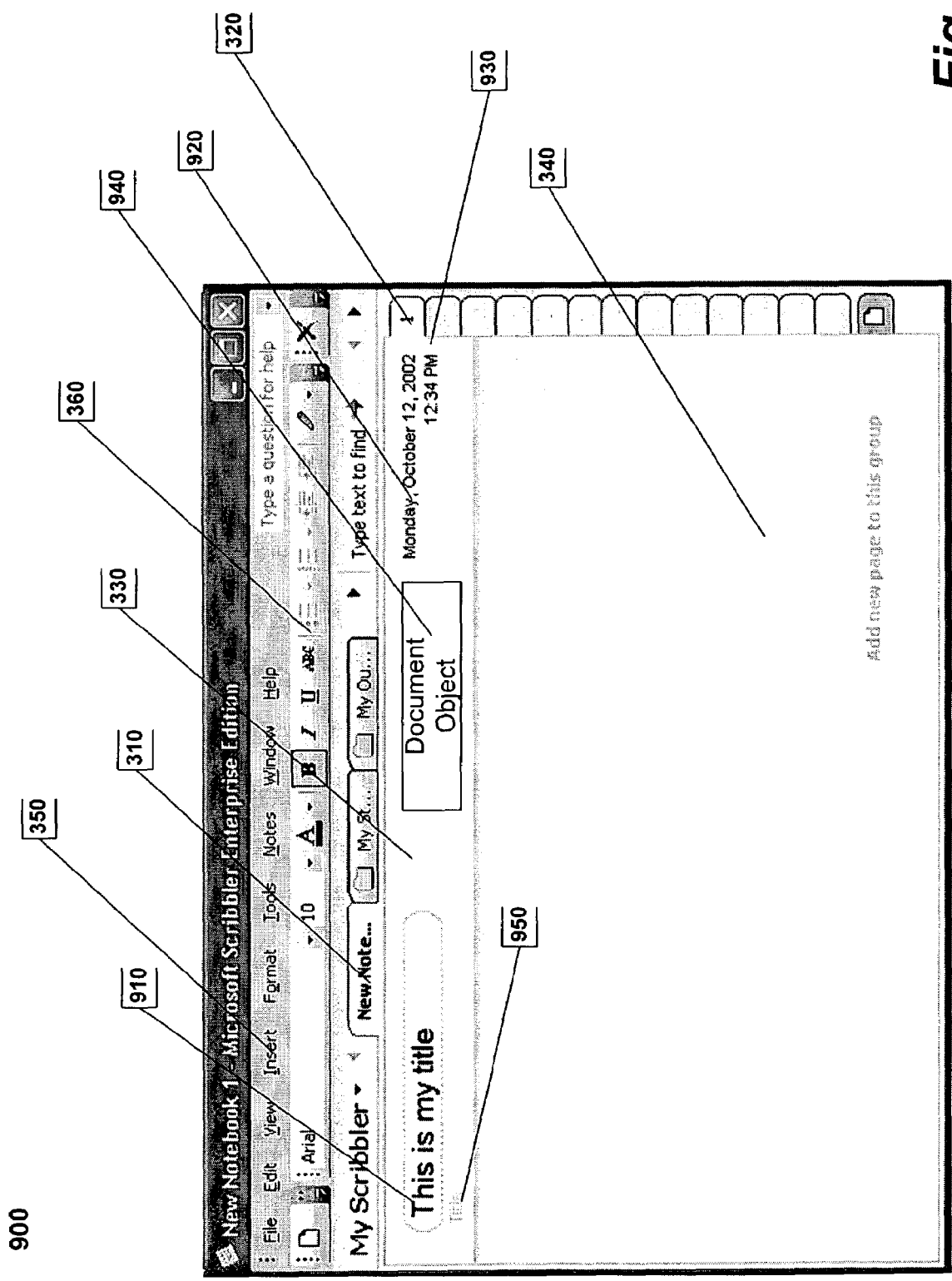
FIG. 9 is a display image showing objects within a title area in accordance with an exemplary embodiment of the present invention.

FIG. 9 is a display image 900 showing objects within a title area in accordance with an exemplary embodiment of the present invention. Referring to FIG. 9, title area 330 can include document objects 910, 920, 930, 940. These document objects may be fixed in place automatically by the document editing module 205 (FIG. 2) or placed in position by a user. Also, the document objects 910, 920, 930, 940 may be copied or moved into the page area 340 or document objects from the page area 340 could be copied or moved into the title area 330. The copying or moving action can be performed using menu commands, the pointing device 265 (FIG. 2), one or more keystrokes, or other method for copying or moving objects about an electronic document.

For example, title area 330 may include the document object 910 for a title of the page group 320. A label 950 may indicate to a user that a title goes into document object 910. The title may be inserted into the document object 910 using the stylus 255 (FIG. 2) in connection with electronic ink, the keyboard 260 (FIG. 2), the pointing device 265 (FIG. 2), or other methods. The document object 910 can be edited.

The document object 920 may include the date the page group was created. The document object 920 may be fixed as to content and position or may be editable by the user. Alternatively, the document object 920 may include the date an individual page within a page group was created or the date the page or page group was last modified. Similarly, the document object 930 may present the time the page group was created and may be fixed as to content and position or may be editable by the user. Alternatively, the document object 930 may include the time an individual page within a page group was created or the time the page or page group was last modified.

In an alternative embodiment, the document objects 910, 920, 930 may be populated by information contained in a scheduling program, such as the "OUTLOOK" program by Microsoft Corporation of Redmond, Wash. For example, the page group 320 may be associated with notes taken at a meeting contained within a user's "OUTLOOK" schedule. The user may be able to associate the page group with the meeting and have document objects 910, 920, 930 populated automatically with the event name and time.

The document object 940 may be inserted by a user. For example, the document object 940 may be a text object that a user wants to have readily available regardless which page the user is viewing within page group 320. The document object 940 may extend below the lower boundary of the viewing area of the title area 330. How document objects are treated when they extend beyond the lower boundary of the viewing area of the title area 330 is discussed below in conjunction with FIGS. 10-13.

Document objects within the title area 330 may be printed along with printing one or more pages of the page group 320. The title area 330 and associated document objects 910, 920, 930 and any other objects added to the title area 330 may be printed on a single, initial page, such as a title page. The title area 330 and associated document objects 910, 920, 930 and any other objects added to the title area 330 may also be printed at a pre-determined position on a printed page, such as the top or bottom.

Figure 10A:
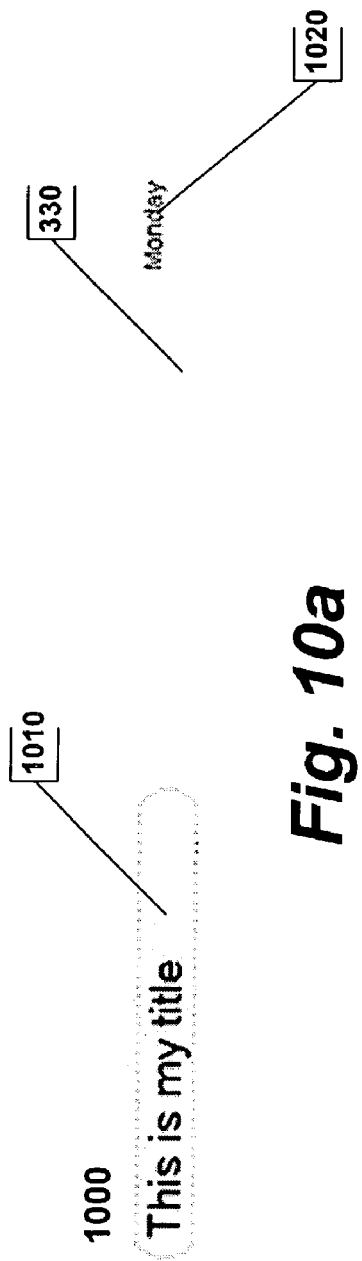
Figure 10B:
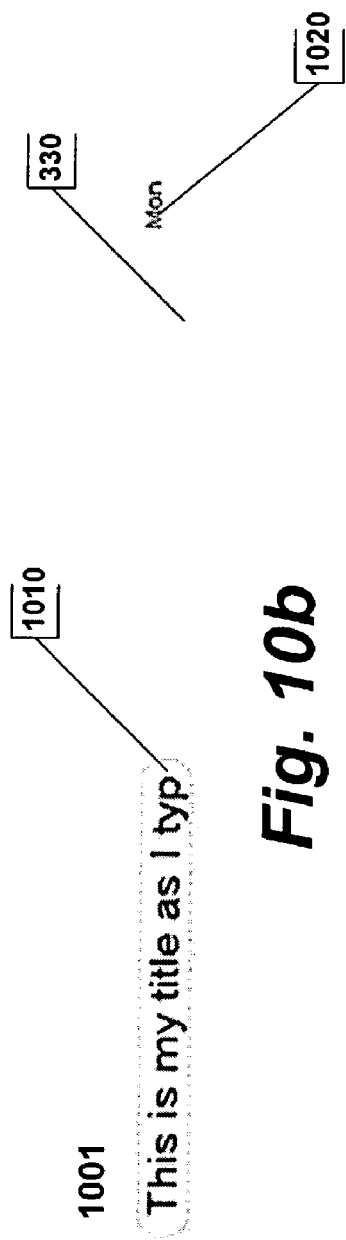

FIGS. 10a-10e are images 1000, 1001, 1002, 1003 illustrating entering a title into a title object within the title area 330 within an exemplary title area 330. Referring to FIG. 10a, image 1000 shows title area 330 with a title document object 1010 and a document object 1020 indicating the day, perhaps the day the page group was created. An area containing no document objects exists between document objects 1010 and 1020 in the exemplary title area 330. Referring now to FIG. 10b, image 1001 depicts text being added to the title document object 1010, for example using a keyboard 260. As the text is added, the object may grow into the area containing no document objects existing between document objects 1010 and 1020. The document object 1020 may be automatically modified to maximize the amount of available empty space. For example, the day of the week may be abbreviated as title document object 1010 moves toward day document object 1020.

Figure 10C:
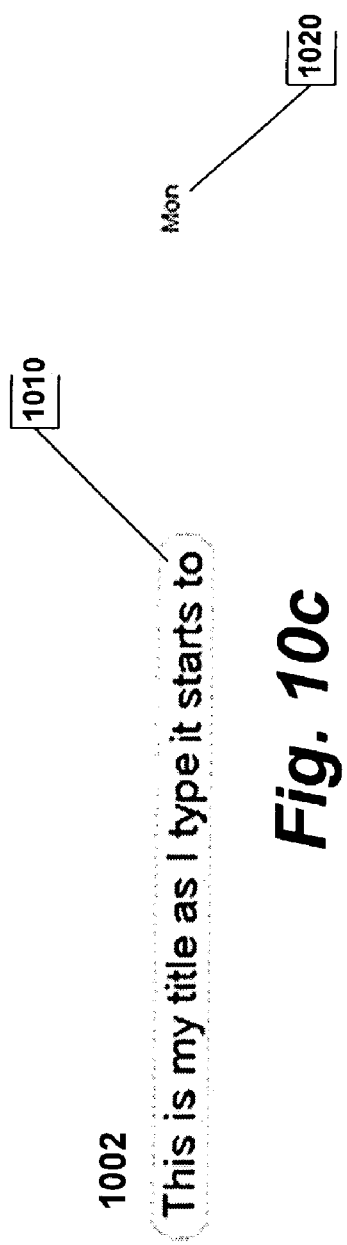

Referring now to FIGS. 10c and 10d, image 1002 shows the size of the title document object 1010 growing to the right toward the document object 1020 and image 1003 shows the title document 1010 filling the entire space to the document object 1020. Once the space is entirely filled, the title document object 1010 can wrap the text to a new line in the title document object 1010. Referring now to FIG. 10e, image 1004 shows title document object 1010 with text wrapped to a new line. When text within the title document object 1010 is wrapped, the font size of the text may be decreased to reduce or eliminate any increase in the size of title document object 1010 in the vertical direction.

Figure 11:
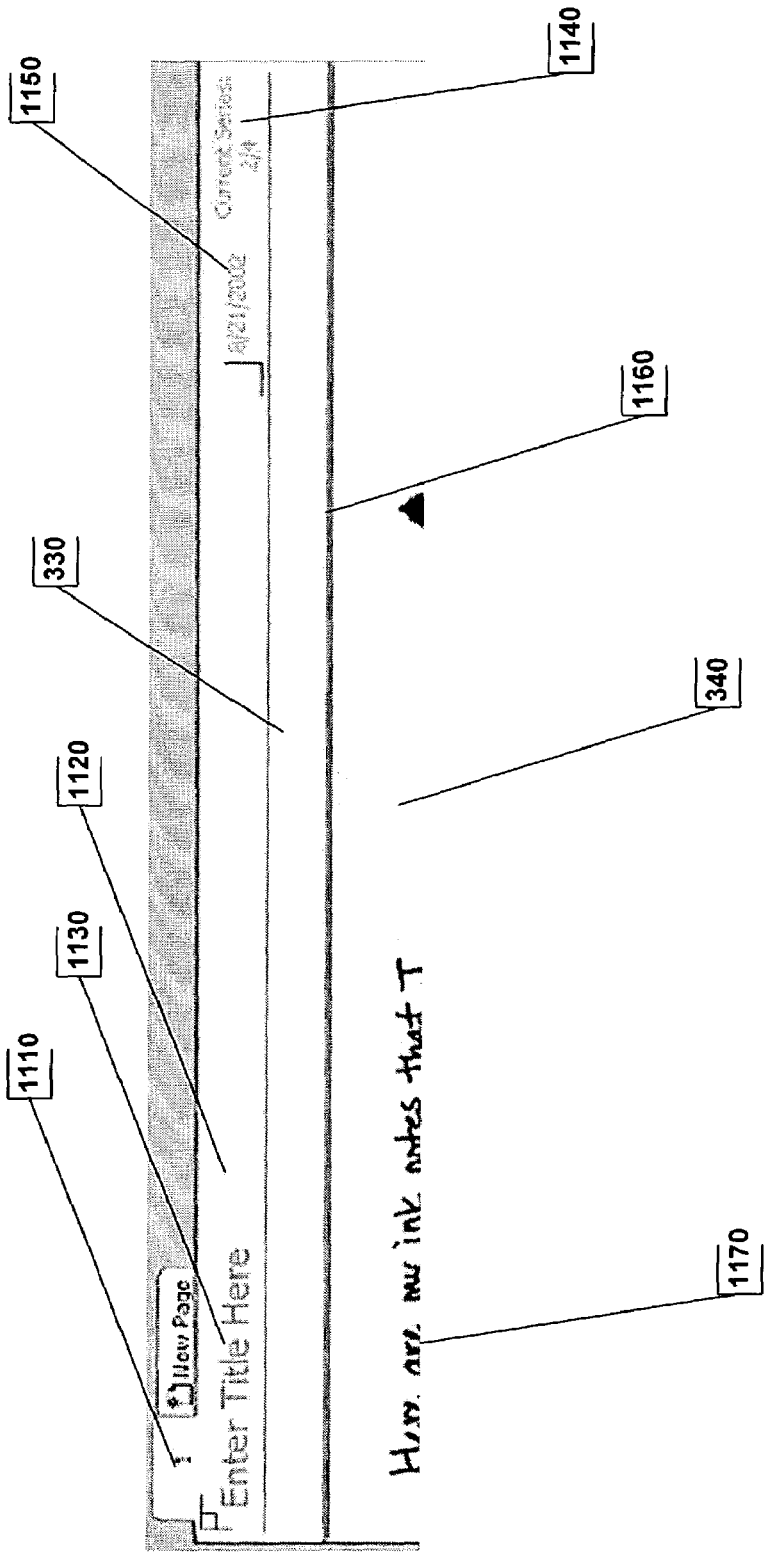
FIG. 11 is a display image showing objects within a title area in accordance with an alternative exemplary embodiment of the present invention.

FIG. 11 is a display image 1100 showing objects within a title area 330 in accordance with an alternative exemplary embodiment of the present invention. Referring now to FIG. 11, the title area 330 can be associated with all of the pages within this page series, indicated by tab 1110 at the top of the image 1100. A title for the page group can be placed in title document object 1110. The title may be inputted using a stylus 255 (FIG. 2) in connection with electronic ink, a keyboard 260 (FIG. 2), pointing device 265 (FIG. 2), or other method. The title document object may include a label 1130 indicating to a user that a title for the page group should be added to the title document object 1110. This label 1130 may disappear once text has been added to the title area 1120.

The title area 330 may also include a page count document object 1140. This object may indicate which page of the series is being displayed and the total number of pages in the series. In the exemplary image 1100, the page count document object 1140 indicates that the second page of the current page group, or series, is being displayed and the page group has a total of four pages. The title area 330 may also include a date document object 1150. The page count document object 1140 and date document object 1150 may have a fixed location or may be positioned by a user. Also, a user may be able to adjust the format of the object, perhaps through a set of menu commands. For example, the date in the date document object 1150 may be displayed as "8/21/2002" or "August 21, 2002," as decided by a user. The title area 330 may be delineated from the page area 340 by a rule 1160. Other document objects, such as an electronic ink document object 1170, may appear in the page area 340 below the rule 1160.

Figure 12:
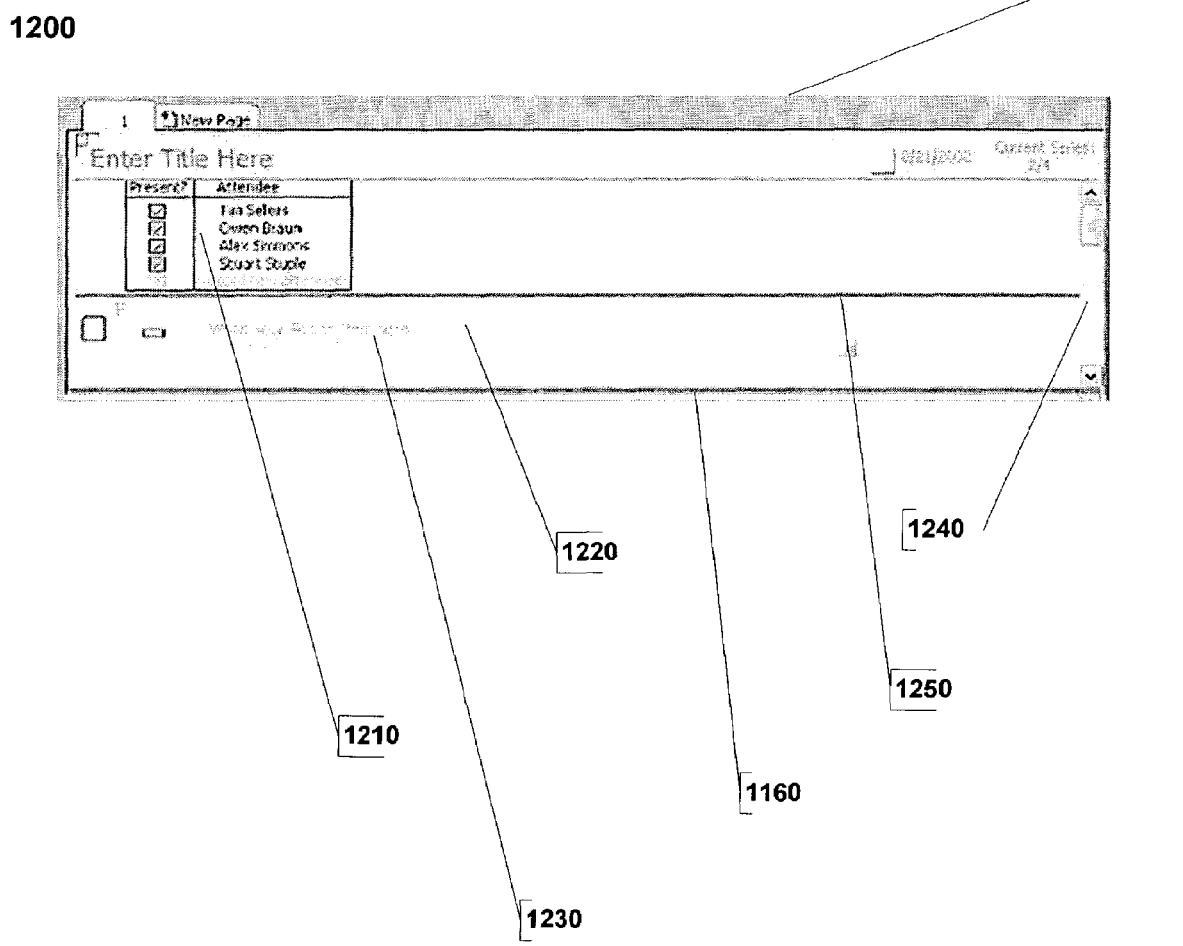
FIG. 12 is a display image showing objects within an expanded title area in accordance with an alternative exemplary embodiment of the present invention.

FIG. 12 is a display image 1200 showing objects within an expanded title area in accordance with an alternative exemplary embodiment of the present invention. Referring now to FIG. 12, image 1200 shows a title area 330 expanded in the vertical direction as compared to image 1100 (FIG. 11). The title area 1200 also includes a document object 1210. The document object 1210 in the exemplary image 1200 shows a list of meeting attendees. For example, a user may want to have a list of meeting attendees in the title area 330 to refer to throughout a meeting. This document object 1210 could be inserted by a user supplying the names or linked to a scheduling program, such as the "OUTLOOK" program, which could populate the document object 1210 with the meeting attendees.

The title area 330 may also include additional document objects, such as document object 1220. These additional document objects may be fixed in content and position or may be established by a user. The document objects may include labels, such as label 1230, which indicates in the exemplary image 1200 to "Write your Action Items here." If document objects extend below the viewing area of the title area 330, that is, below rule 1160, a scroll bar 1240 may appear to allow the user to scroll in the vertical direction to see additional content. Similarly, objects may extend beyond the side boundaries and a horizontal scroll bar (not shown) may appear to allow a user to move the viewing area to see other parts of the objects. Also, the additional document objects may be separated from other document objects within the title area 330 with a rule 1250. The rule 1250 may separate the title area 330 into a region that has a non-fixed size and can use a scroll bar 1240 to view the complete region and a region that is fixed in size, with no option for using a scroll bar.

Figure 13:
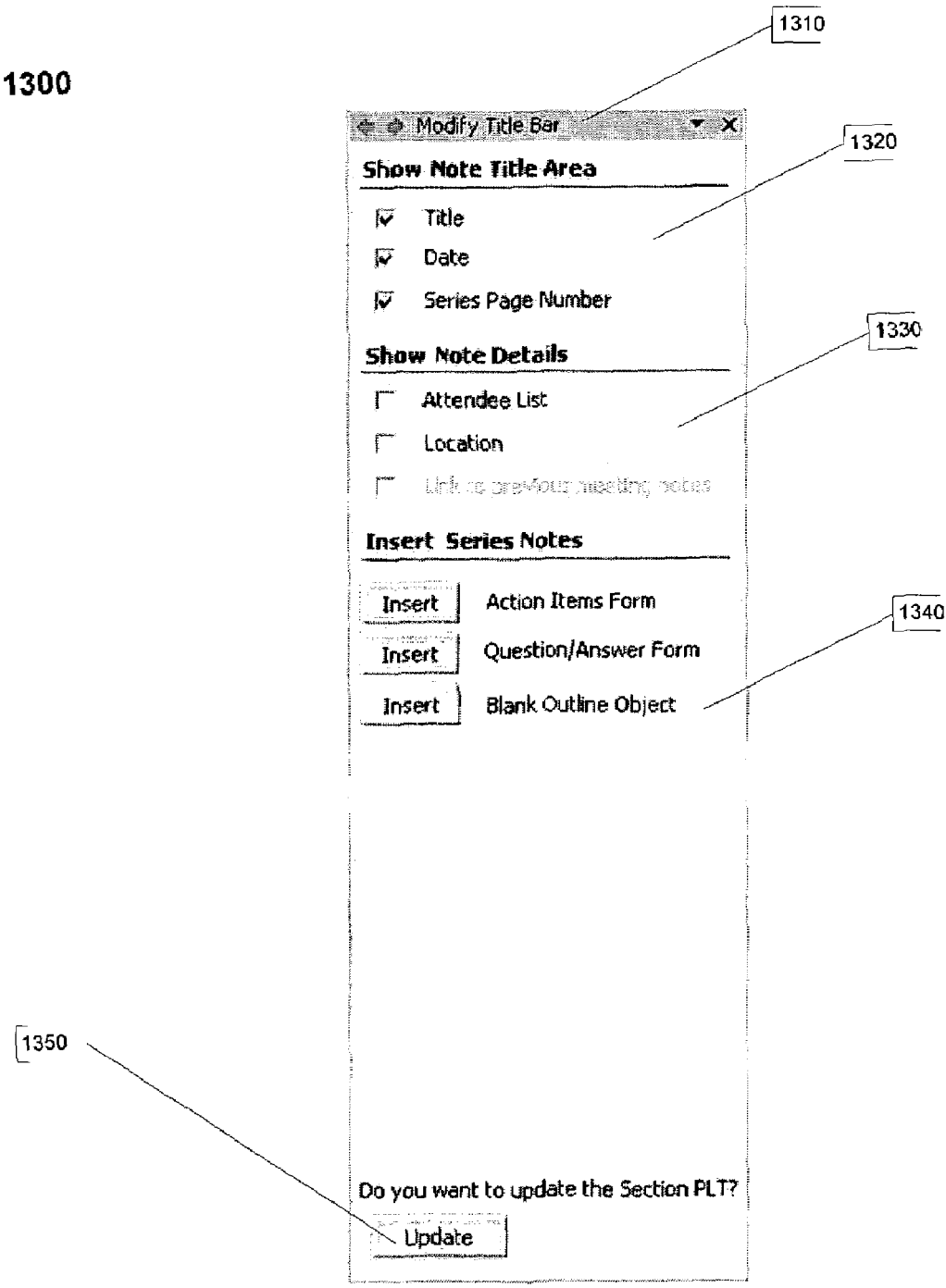
FIG. 13 is a display image of a menu item that allows modification of a title area of an exemplary embodiment of the present invention.

FIG. 13 is a display image 1300 of a menu item that allows modification of a title area 330 in accordance with an exemplary embodiment of the present invention. Referring now to FIGS. 11, 12 and 13, some document objects included in the title area 330 may be predetermined by a free-form document editor, in other words, the content and generally format of the object may be established by the free-form document editor. These document objects, such as the title document object 1120, date document object 1150, page count document object 1140, and attendee list document object 1210, may be automatically included into the title area 330 or inserted based on a user selecting the objects to insert. Image 1300 shows a menu 1310 that may be used by a user to select objects to include in a title area. The menu 1310 may include a check box, such as check box 1320, for selecting objects or other means to indicate that the object should be included in the title area 330. Also, the menu 1310 may include objects designed for a specific application, such as the objects in menu region 1330, designed for a business meeting. The menu 1310 may also include a region 1340 for inserting other, more generic, document objects. The menu 1310 may include a method for updating the title area, such as a control button 1350.

Figure 14:
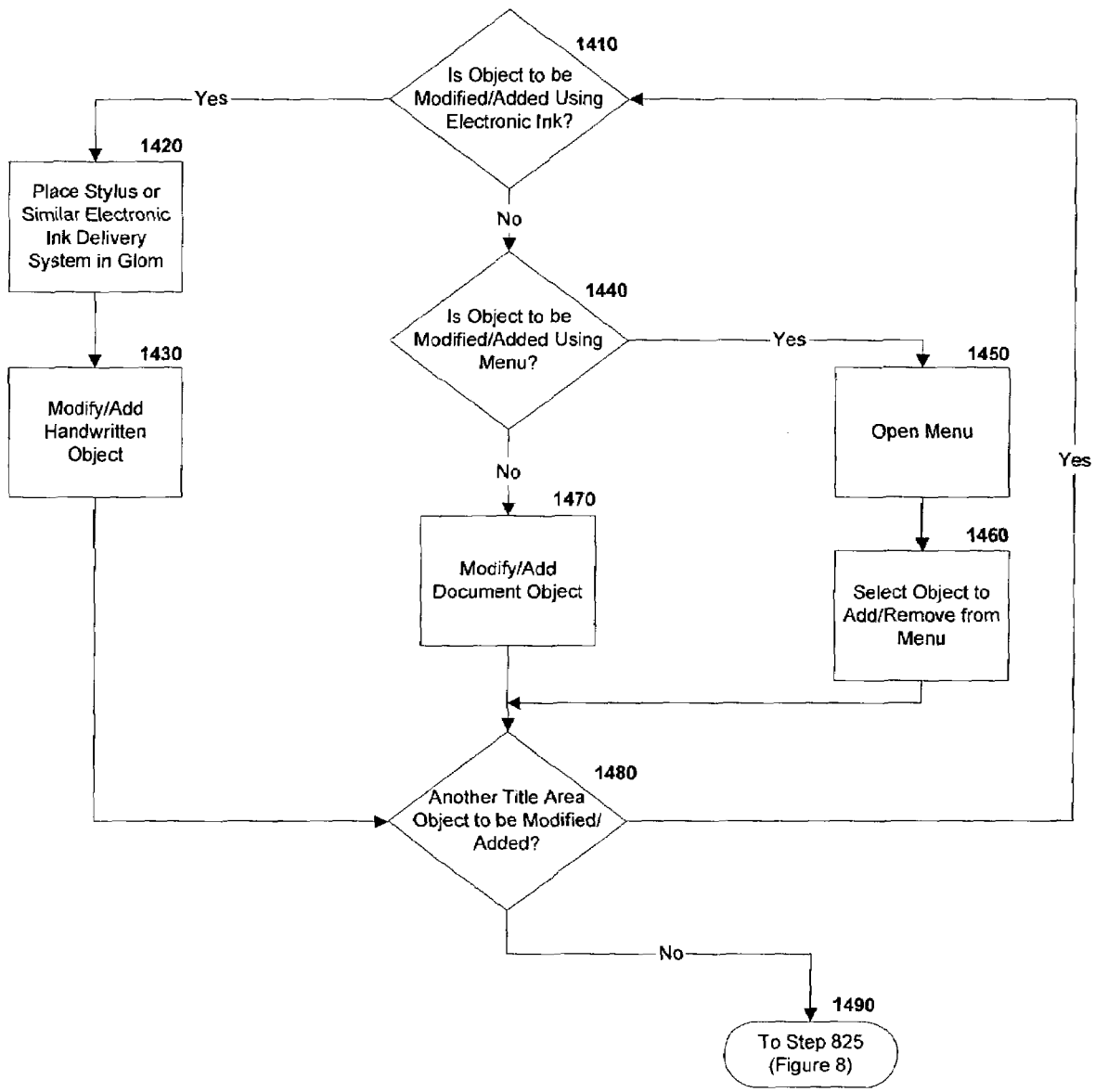
FIG. 14 is a flow diagram presenting a process for modifying a title area in an exemplary embodiment of the present invention.

FIG. 14 is a flow diagram presenting the process 815 for modifying a title area in accordance with an exemplary embodiment of the present invention. Referring to FIG. 14, at step 1410, the process 815 determines if the object in the title area is to be modified or added using electronic ink. If so, the process moves to step 1420 and user places a stylus or similar device for delivering electronic ink into a writing guide. A writing guide can appear on the document editor page as the user begins to input electronic ink strokes onto a tablet. If a writing guide module determines that the ink strokes comprise handwriting writing, then a handwriting guide can be displayed. As the user continues to write and to create more structure, various forms of the handwriting guide can allow the user to create more complex structure within the outline object. For example, writing guides, writing guide portions, bullet writing guides, indent markers, and other writing guides can show the user how to predictably create more complicated and meaningful structure within an outline object. At step 1430, the handwritten object is modified or added.

If the object is not to be added or modified using electronic ink, the process moves to step 1440 and determines if the object is to be modified or added using a menu. If so, the process moves to step 1450, where the appropriate menu is determined and opened. Then, the process moves to step 1460, where the desired object to add, remove, or modify or format to apply is selected. If a menu is not to be used, the process moves to step 1470 and the object is modified by other means, such as a keyboard 260 or pointing device 265 as shown in FIG. 2.

From either step 1430, 1460, or 1470, in other words, the steps where the object is modified, the process moves to step 1480 and determines if another object is to be modified. If so, the process returns to step 1410 and repeats. Otherwise, it moves to step 1490 and terminates.

Figure 15A:
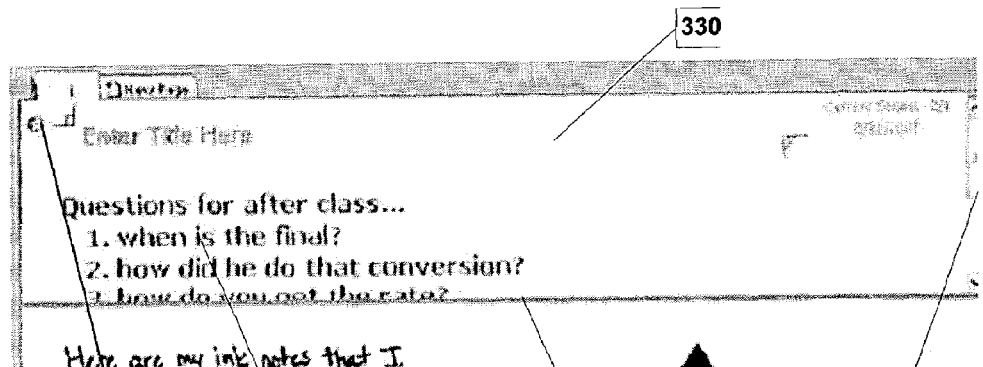
FIGS. 15a-b are display images showing how the title area size can be altered in accordance with an alternative exemplary embodiment of a title area for the present invention.

FIG. 15*a* is a display image 1500 showing how the title area size can be altered in accordance with an alternative exemplary embodiment of a title area 330 for the present invention. Referring now to FIG. 15*a*, the title area 330 includes document object 1510. As indicated by the presence of scroll bar 1230, one or more document objects, such as document object 1510 extend below the rule 1160. The document object 1510 can be accessed by using the scroll bar 1230, moving the bar in a downward direction to reveal content extending below rule 1160. Alternatively, the title area 330 may be enlarged by moving the rule 1160 down the page. This movement may be accomplished by using the point device 265 (FIG. 2) to select the rule 1160 and dragging and dropping the rule 1160 to another position.

Figure 15B:
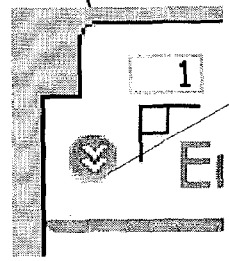

Referring now to FIGS. 15*a* and 15*b*, the title area 1530 may include an icon 1530 or other similar method, such as a menu item, to increase or reduce the size of the title area 330 with a single activation of the icon 1530. For example, the rule 1160 could be dragged and dropped to a new location, making the title area 330 larger. Activating icon 1530 could cause the title area 1530 to collapse to its original size, such as to a size that shows the title only. A second activation of the icon 1530 could increase the size of the title area 1530 back to the previous established size or some other preset size. Similarly, an icon, menu item, or other command may be used to totally hide the title area from view.

Figure 16:
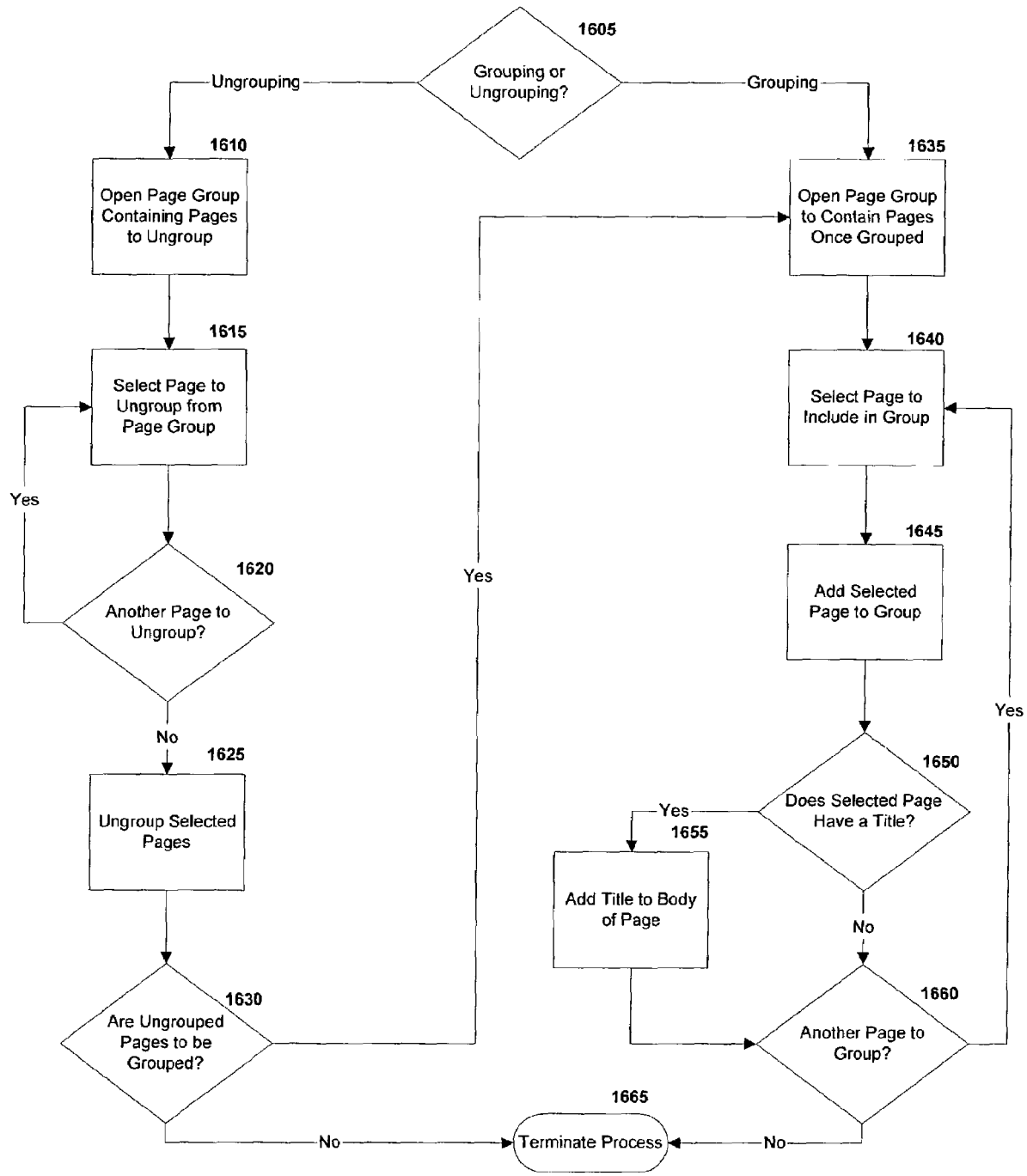
FIG. 16 is a flow diagram presenting the process for grouping and ungrouping pages in a page group for an exemplary embodiment of the present invention.

FIG. 16 is a flow diagram presenting the process 1600 for grouping and ungrouping pages in a page group in accordance with an exemplary embodiment of the present invention. In the exemplary embodiment, pages can be moved from one group to another or separated from an existing group to form a new group. These grouping and ungrouping actions would be analogous to removing a staple or paper clip from one or more groups of papers, separating papers from those groups, and combining the separated sheets into a new group. The new groups of papers can then be re-fastened with a paper clip or staple. Similarly, previously loose sheets of paper could be added to an existing group or formed into a new group, possible combined with papers from other groups.

Referring to FIG. 16, at step 1605, the process depends on whether the action is a grouping action or ungrouping action, based on the desire of a user. If an ungrouping action is to be performed, the process moves to step 1610 and a page group containing pages to ungroup is opened. At step 1615, a page to be ungrouped from the opened page group is selected. This selection may be made by using a pointing device 265 (FIG. 2) or keyboard 260 (FIG. 2) or other common means for selecting a collection of objects. At step 1620, the user determines if any other pages should be ungrouped. If so, the process returns to step 1615. If not, the process moves to step 1625 and the pages are ungroup. This action may be accomplished by activating an icon or selecting a menu item. In an alternative embodiment, all pages of the page group could be ungrouped, using a single command, such as activating an icon or selecting a menu item, instead of ungrouping selected pages from a page group. Once ungrouped, each separated page may have the title area 330 from the page group containing the separated pages inserted into the page area 340, possibly as a document object. This document object may then be edited as any document object. Also, if any of the separated pages are re-inserted into their original page group, this document object may automatically be removed.

After the pages have been ungrouped, the process moves to step 1630 and a determination is made as to whether the pages are to be grouped together or added to other groups. If yes, the process moves to step 1635. If not, the process moves to step 1665 and terminates. This termination step may include closing the opened page group.

If, at step 1605, a grouping action is desired, or if the result of step 1630 is a "Yes," the process moves to step 1635 and a page group that will contain the additional pages is opened. This may be a new or existing page group. At step 1640, a page to include in the group is selected. This selection may be made by using a pointing device 265 or keyboard 260 or other common means for selecting a collection of objects. At step 1645, the selected page is added to the page group. At step 1650, the process determines whether the selected page has a title. If so, the title is included on the page area of the newly grouped page at step 1655. A page selected from one page group to be grouped into another page group may contain a title in the title area based on the title given to the original page group. This title does not appear in the title area of the new page group, but rather may be included on the page area over the text from the selected page.

The process then moves to step 1660 and a decision is made as to whether additional pages should be added. If "Yes," the process returns to step 1640. If not, the process moves to step 1665 and terminates. This termination step may include closing the opened page group.

Once pages are added to a new or different page group, these pages may have a title area attributable to the new or different page group associated with each added page. In other words, when a page is either moved into an existing page group or forms a new page group, the title area associated with the existing or new page group may then be associated with the page.

One skilled in the art would appreciate that the present invention supports grouping pages together in an electronic document and providing a continually-viewable title area associated with each page in the electronic document. An exemplary computer-implemented method can maintain a title area on the viewable area of a display screen whenever a page within a page grouping is displayed. The title area may contain editable document objects accessible while viewing any page in the page group. Some of these document objects may contain information derived from other computer programs, such as a scheduling program, and information may be automatically placed into these document objects. The size and format of the title area may be customized and the entire title area may be hidden from view.

Also, pages may be moved from one page group to another. These moved pages may be associated with the title area of the new page group, with the title area of the original page group inserted into the page as a document object.

What is claimed is:

1. A computer-implemented method for grouping pages within an electronic document for a free-form document editor, comprising:

creating the electronic document with the free-form document editor by inserting at least one document object into a first document page;

creating a second document page within the electronic document by inserting at least one document object into the second document page;

creating a grouping relationship between the second document page with the first document page within the electronic document, the grouping relationship comprising one of the following: the first document page proceeding the second document page in the electronic document and the second document page proceeding the first document page in the electronic document;

displaying a title area in response to displaying the first or second document pages of the electronic document on an output screen, wherein the title area comprises at least two document objects wherein, when text is entered into a first of the at least two document objects, a space between the at least two document objects is configured to shrink and text in a second of the at least two document objects becomes abbreviated to minimize space in the title area taken by the second of the at least two document objects and to maximize the space between the at least two document objects; and maintaining the title area in a continually-viewable fixed position on the output screen as long as the first or second pages of the electronic document are viewable on the output screen.

2. The method of claim 1 wherein the title area is maintained above a display image when the first and second pages of the electronic document are presented on the output screen.

3. The method of claim 1 wherein the at least one document object is inserted into the title area by use of a computer input device.

4. The method of claim 1 wherein the at least one document object is inserted into the title area by the free-form document editor.

5. The method of claim 4 wherein the at least one document object in the title area comprises a data item from a computer file other than the computer file comprising the electronic document.

6. The method of claim 5 wherein the computer file comprises at least one scheduling data item.

7. The method of claim 4 wherein one of the inserted document objects within the title area comprises the date the electronic document was created.

8. The method of claim 4 wherein one of the inserted document objects within the title area comprises the page number associated with one of the pages of the electronic document presented on the output screen.

9. The method of claim 8 wherein the document object further comprises the total number of the pages in the electronic document.

10. The method of claim 4 wherein the free-form document editor inserts the at least one document object into the title area in response to a selection of at least one predetermined document object from a menu.

11. The method of claim 10 wherein one of the predetermined document objects comprises a data item from a computer file other than the computer file comprising the electronic document.

12. The method of claim 10 wherein one of the predetermined document objects comprises a title.

13. The method of claim 10 wherein one of the predetermined document objects comprises a date.

14. The method of claim 10 wherein one of the predetermined document objects comprises a page number.

15. The method of claim 1 wherein at least one of the document objects in the electronic document is rendered in electronic ink.

16. The method of claim 1 wherein at least one of the document objects in the electronic document can be edited with a computer input device.

17. The method of claim 1 wherein all of the document objects within the first document page are displayed within a viewable area of the first document page and all of the document objects within the second document page are displayed within a viewable area of the second document page.

18. A computer-readable storage device storing a set of computer-executable instructions for performing the method of claim 1.

\* \* \* \* \*